United States Patent [19]
Yamano et al.

[11] Patent Number: 5,727,241
[45] Date of Patent: Mar. 10, 1998

[54] PHOTOGRAPHIC LENS, CAMERA BODY, AND CAMERA SYSTEM

[75] Inventors: Shozo Yamano, Shinagawa-ku; Riichi Higaki, Kawasaki, both of Japan

[73] Assignee: Nikon Corporation, Tokyo, Japan

[21] Appl. No.: 782,320

[22] Filed: Jan. 15, 1997

[30] Foreign Application Priority Data

Jan. 24, 1996 [JP] Japan .................. 8-010037

[51] Int. Cl.⁶ ............................................... G03B 7/26
[52] U.S. Cl. ............................... 396/279; 396/303
[58] Field of Search ........................... 396/279, 277, 396/303, 301, 302

[56] References Cited

U.S. PATENT DOCUMENTS 5,113,210  5/1992  Kashiyama et al. .......... 396/301 X
5,557,365  9/1996  Ohsawa ........................ 396/279

*Primary Examiner*—W. B. Perkey

[57] ABSTRACT

A camera system regulates electric power from a power supply within a camera body to a plurality of built-in actuators within a removable photographic lens. The actuators may include motors, solenoids, and the like which operate functions such as autofocus and image blur suppression. The photographic lens is equipped with a memory which stores data relating to the power supply characteristics of the built-in actuators. A transmission unit within the photographic lens transmits the stored data to a receiving unit within the camera body. A power supply characteristics measurement unit within the camera body measures data relating to power supply characteristics of the electric power supply while a determination unit determines whether to supply electric power from the electric power supply to the actuators in response to all of the data. A display unit on the camera body displays a warning when no electric power is supplied to the actuator.

20 Claims, 29 Drawing Sheets

| COMMAND | CONTENTS | DATA SENT | DATA RECEIVED |
|---|---|---|---|
| 27H | AE DATA, AF DATA, etc., LENS DATA ACQUISITION | 0 | 40 |
| 29H | ACQUISITION OF LENS ACTUATOR DRIVE LIMIT DATA | 0 | 6 |
| 30H | ZOOMING DRIVE | 1 | 0 |
| 31H | ZOOMING INHIBIT | 0 | 0 |
| 32H | AF DRIVE | 3 | 0 |
| 33H | AF INHIBIT | 0 | 0 |
| 34H | MOTION COMPENSATION DRIVE | 0 | 0 |
| 35H | MOTION COMPENSATION INHIBIT | 0 | 0 |

FIG. 8

FIG. 11A H/S (B)
FIG. 11B H/S (L)
FIG. 11C CLK
FIG. 11D DATA

| ACTUATOR | VOLTAGE | CURRENT |
|---|---|---|
| ZOOM MOTOR | DATA 1 (4 V) | DATA 2 (250 mA) |
| AF MOTOR | DATA 3 (4 V) | DATA 4 (500 mA) |
| MOTION COMPENSATION MOTOR | DATA 5 (4 V) | DATA 6 (800 mA) |

| MODE | ZOOM | AF | MOTION COMPENSATION | DECISION FLAG |
|---|---|---|---|---|
| MODE 1 | ☐ | — | — | JDG 1 |
| MODE 2 | — | ☐ | — | JDG 2 |
| MODE 3 | — | — | ☐ | JDG 3 |
| MODE 4 | ☐ | ☐ | — | JDG 4 |
| MODE 5 | ☐ | — | ☐ | JDG 5 |
| MODE 6 | — | ☐ | ☐ | JDG 6 |
| MODE 7 | ☐ | ☐ | ☐ | JDG 7 |

FIG. 18

| MODE | RELEASE | AF | MOTION COMPENSATION | DECISION FLAG |
|---|---|---|---|---|
| MODE 8 | ☐ | ☐ | — | JDG 8 |
| MODE 9 | ☐ | — | ☐ | JDG 9 |
| MODE 10 | ☐ | ☐ | ☐ | JDG 10 |

PHOTOGRAPHIC LENS, CAMERA BODY, AND CAMERA SYSTEM

CROSS-REFERENCE TO RELATED APPLICATIONS

This application is based upon and claims priority of Japanese Patent Application No. 08-010037 filed Jan. 24, 1996, the contents being incorporated herein by reference.

BACKGROUND OF THE INVENTION

The present invention relates to photographic lenses, camera bodies, and camera systems, and in particular, it relates to power supply systems for actuators in photographic lenses.

In photographic lenses which are interchangeably mounted on camera bodies, it is known to build-in various kinds of actuators, such as motors, solenoids, and the like, for use in focus adjustment, focal length adjustment, motion compensation, image blur suppression, and the like.

Image blur suppression devices work within an optical system and have as their object the suppression or reduction of blurring in an image projected onto an image plane. A motion compensation device is a type of image blur suppression device which compensates for motion incident upon the optical system. Motion is typically imparted to the optical system by way of vibrations in the optical system itself, or in a surrounding holding member. In general, known motion compensation devices cause a compensation lens to shift counter to the motion of the optical system so as to shift the image projected by the optical system relative to the optical system.

Photographic lenses which possess built-in actuators perform required operations according to instructions from a camera body on which they are mounted. The photographic lenses receive from the camera body a supply of electric power for actuator drive control circuits and electric power for driving built-in actuators.

However, the power supplies within a camera body are generally battery power supplies. Consequently, in the prior art, means to monitor a battery voltage or means to apply a predetermined "dummy load" to the battery and acquire its voltage and rate of fall were provided. In the case that the battery voltage falls below a predetermined value, the prior art camera performs a battery warning display indicating to the user that there is a lack of battery capability.

However, when deciding whether or not there is an adequate electric power supply capability from the camera battery voltage alone, a number of disadvantages arise. For example, the current consumption or electric power consumption, etc., of a focus adjustment motor differs when the photographic lens is changed. In this case, the camera may decide that photographic lens driving is impossible in spite of the drive capability for a small drive current. On the contrary, the camera may decide that there is still a capability to supply current when, in actuality, the consumption of current and power is large. In this case, the desired operation is not obtained.

Moreover in the prior art method, the case of plural actuators presents additional problems. In some cases, the power supply may actually be sufficient to drive the plural actuators individually. However, due to erroneous signals, battery current may be wasted because the camera erroneously decides that there are problems in simultaneously driving the plural actuators. In this case, the plural actuators are driven independently, which thereby reduces responsiveness of the photographic lens. To correct this situation and allow uniform driving of the plural actuators when permitted by the power supply, improvement is desired.

BRIEF SUMMARY OF THE INVENTION

It is therefore an object of the present invention to provide a photographic lens, camera body and camera system, which are able to supply electric power according to the power supply characteristics of the individual actuators of the photographic lens.

It is a further object of the present invention to regulate power requirements of a plurality of actuators in a mountable photographic lens with respect to the power capability of a power supply within a camera body.

It is still a further object of the present invention to improve communication between a photographic lens having a plurality of actuators and a camera body having an internal power supply and a power control system.

Moreover, it is a further to provide a warning display on a camera body upon determining that power requirements of a plurality of actuators within a removably mountable photographic lens exceed the power capability of an internal electric power supply.

Objects of the invention are achieved by a camera system including a photographic lens mounted on a camera body which has an electric power supply, comprising: a first actuator disposed within the photographic lens which receives electric power from the camera body; a memory disposed within the photographic lens which stores first data relating to power supply characteristics for driving the first actuator; and a transmission unit disposed within the photographic lens which transmits the first data from the memory to the camera body.

Objects of the invention are further achieved by a camera system including: a power supply characteristics measurement unit disposed within a camera body which measures and acquires second data relating to power supply characteristics of an electric power supply; and a determination unit disposed within the camera body which determines whether to supply electric power from the electric power supply to the first actuator in response to the first and second data.

Objects of the invention are further achieved by a camera system including a first display unit disposed on a camera body which displays a warning when a determination unit determines not to supply electric power to a first actuator within a photographic lens removably mounted to a camera body.

Moreover, objects of the invention are achieved by a camera system having a first and second actuator disposed within a photographic lens and receiving electric power from a camera body, wherein the first and second actuators operate simultaneously or sequentially, a determination unit determines whether to supply electric power from the electric power supply to the first and second actuators simultaneously or sequentially.

Objects of the invention are further achieved by a photographic lens which is mountable on a camera body having an electric power supply, including a first actuator which operates by receiving electric power from the electric power supply, a memory which stores first data relating to power supply characteristics for driving the first actuator, and a receiving unit which receives second data relating to power supply characteristics of the electric power supply.

Further objects of the invention are achieved by a photographic lens having a timing adjustment unit which inhibits plural actuators from being driven simultaneously according to a decision results of a determination unit when a power requirement of the plural actuators competes with the requirements of the photographic lens and the camera body.

Moreover, objects of the invention are achieved by a camera system including a photographic lens mounted on a camera body, and having an electric power supply disposed within the camera body; an actuator disposed within the photographic lens which receives electric power from the electric power supply; a memory disposed within the photographic lens which stores first data relating to power supply characteristics for driving the actuator; a transmission unit disposed within the photographic lens which transmits the first data from the memory to the camera body; a power supply data accumulation unit disposed within the camera body which receives the first data from the transmission unit; a power supply characteristics measurement unit disposed within the camera body which measures and acquires second data relating to power supply characteristics of the electric power supply; and a determination unit disposed within the camera body which determines whether to supply electric power from the electric power supply to the actuator in response to a received actuator drive demand.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 8 is a table of example communication commands according to a preferred embodiment of the present invention.

FIG. 11 is a timing chart of data acquisition from a photographic lens according to a preferred embodiment of the present invention.

FIG. 18 is a table relating to actuators and decision modes according to a preferred embodiment of the present invention.

FIG. 19 is a table relating to actuators and decision modes according to a preferred embodiment of the present invention.

DETAILED DESCRIPTION OF THE PREFERRED EMBODIMENTS

Figure 1:
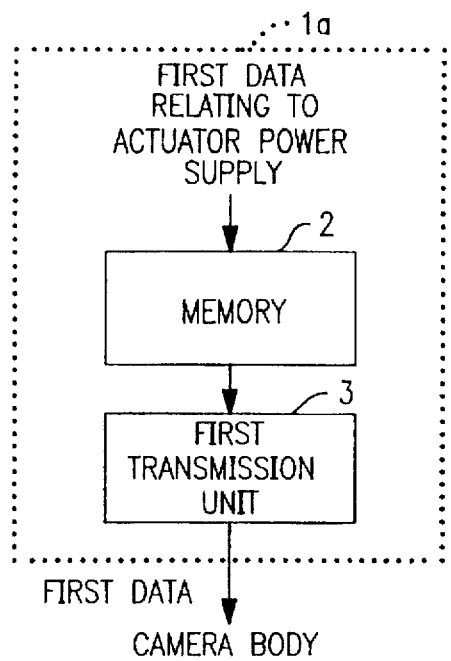
FIG. 1 is a block diagram illustrating data transmission according to a first preferred embodiment of the present invention.

Reference will now be made in detail to the preferred embodiments of the present invention, examples of which are illustrated in the accompanying drawings, wherein like reference numerals refer to like elements throughout.

In reference to FIG. 1, photographic lens 1a includes first transmission unit 3 which transmits first data relating to the required power supply characteristics of the appropriate actuator, already stored in memory 2, to the camera body as required. The required power supply characteristics of the appropriate actuator possessed by photographic lens 1a can then be transmitted to the camera body.

Figure 2:
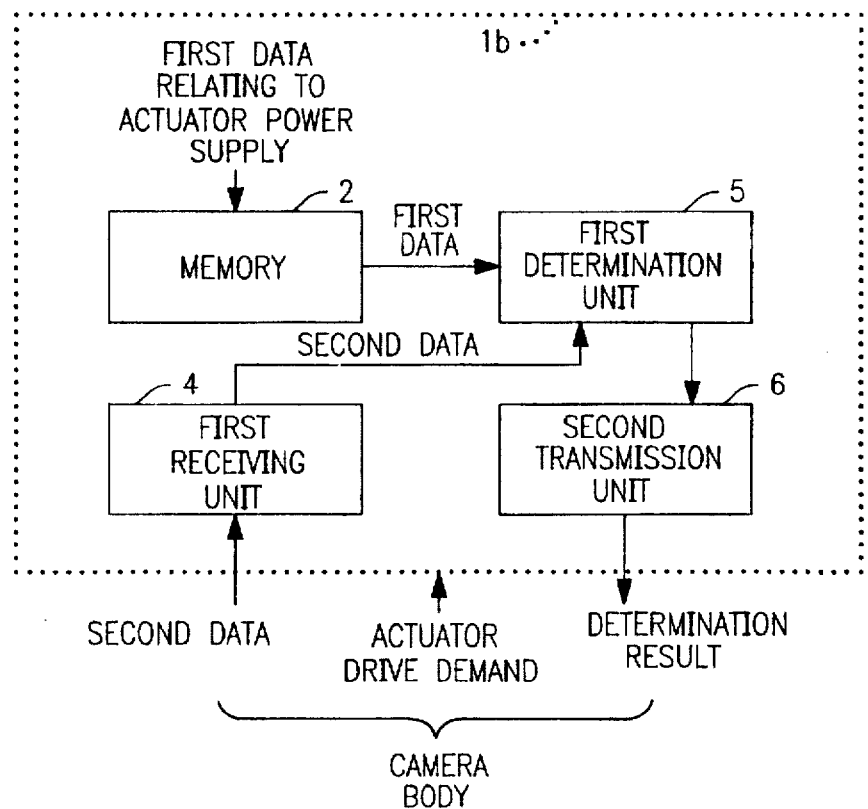
FIG. 2 is a block diagram illustrating data transmission according to a second preferred embodiment of the present invention.

FIG. 2 illustrates photographic lens 1b according to a second preferred embodiment of the present invention. Photographic lens 1b includes first determination unit 5. First determination unit 5 decides from the first data relating to the required power supply characteristics of the appropriate actuator, already stored in memory 2, and from the second data relating to the power supply characteristics of the built-in power supply accumulated from the camera body by first receiving unit 4, whether the power supply built into the camera body can supply the electric power necessary for driving with respect to this actuator. This determination is based on the first data and the second data with respect to an actuator drive demand which is input from the camera body. Second transmission unit 6 transmits this decision result to the camera body. Accordingly, the decision result of whether the power from the camera body can drive the appropriate actuator of photographic lens 1b can be sent to the camera body.

Figure 3:
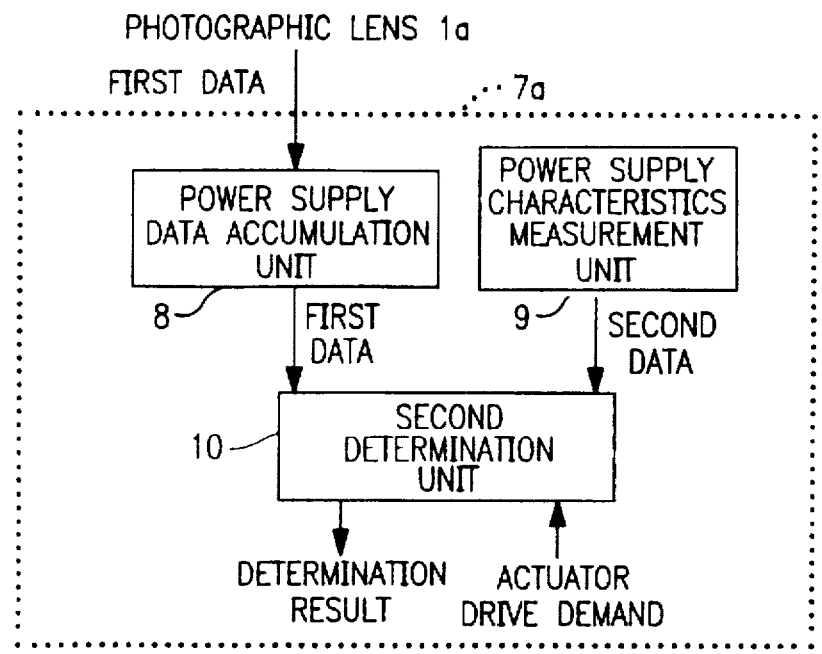
FIG. 3 is a block diagram illustrating data transmission within a camera body according to a preferred embodiment of the present invention.

FIG. 3 illustrates camera body 7a according to a preferred embodiment of the present invention. Camera body 7a receives data from photographic lens 1a, illustrated in FIG. 1. Camera body 7a includes second determination unit 10 which decides, from the first data which power supply data accumulation unit 8 has accumulated (relating to the required power supply characteristics to drive the actuator of photographic lens 1a), and from the second data showing the power supply characteristics of the built-in power supply, which power supply characteristics measurement unit 9 has measured and acquired, whether the required power can be supplied for the actuator of photographic lens 1a.

Figure 4:
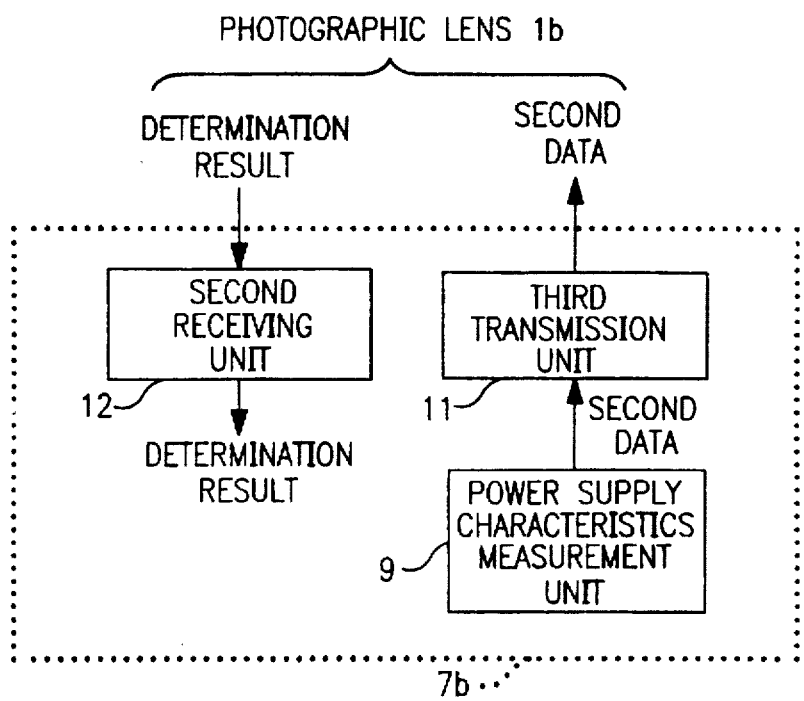
FIG. 4 is a block diagram illustrating data transmission within a camera body according to a preferred embodiment of the present invention.

FIG. 4 illustrates camera body 7b according to a preferred embodiment of the present invention. Camera body 7b includes third transmission unit 11. Third transmission unit 11 transmits to photographic lens 1b the second data showing the power supply characteristics of the built-in power supply, which the power supply characteristics measurement unit 9 has measured and acquired. Second receiving unit 12 accumulates the decision result of first determination unit 5 from photographic lens 1b.

Accordingly, when a drive requirement has occurred for the actuator of a mounted photographic lens, it becomes possible to adopt, for each individual actuator, the action that it drives if there is sufficient time, and does not drive if there is not sufficient time.

A first display unit within photographic lens 1a of FIG. 1 (not shown) performs a warning display when the capability to supply power to the actuator which it was required to drive is not sufficient. Moreover, a second display unit within photographic lens 1a (not shown) performs an inhibition display when there is no capability to supply power to an actuator which requires power. Accordingly, the photographer can be informed whether or not an actuator can be driven. Likewise, the first and second display units may be applied to photographic lens 1b of FIG. 2.

A first timing adjustment unit adjusts the drive timing of plural actuators within a photographic lens. When plural drives are required for actuators of the photographic lens, adjustment is made so that there is no overlap of drive timing. Moreover, a second timing adjustment unit provides adjustment such that, when the actuator driving requirements conflict, the actuators of the photographic lens and the actuators of the camera body are not driven with an overlapping of timing. Accordingly, the battery can be used with good efficiency.

Figure 5:
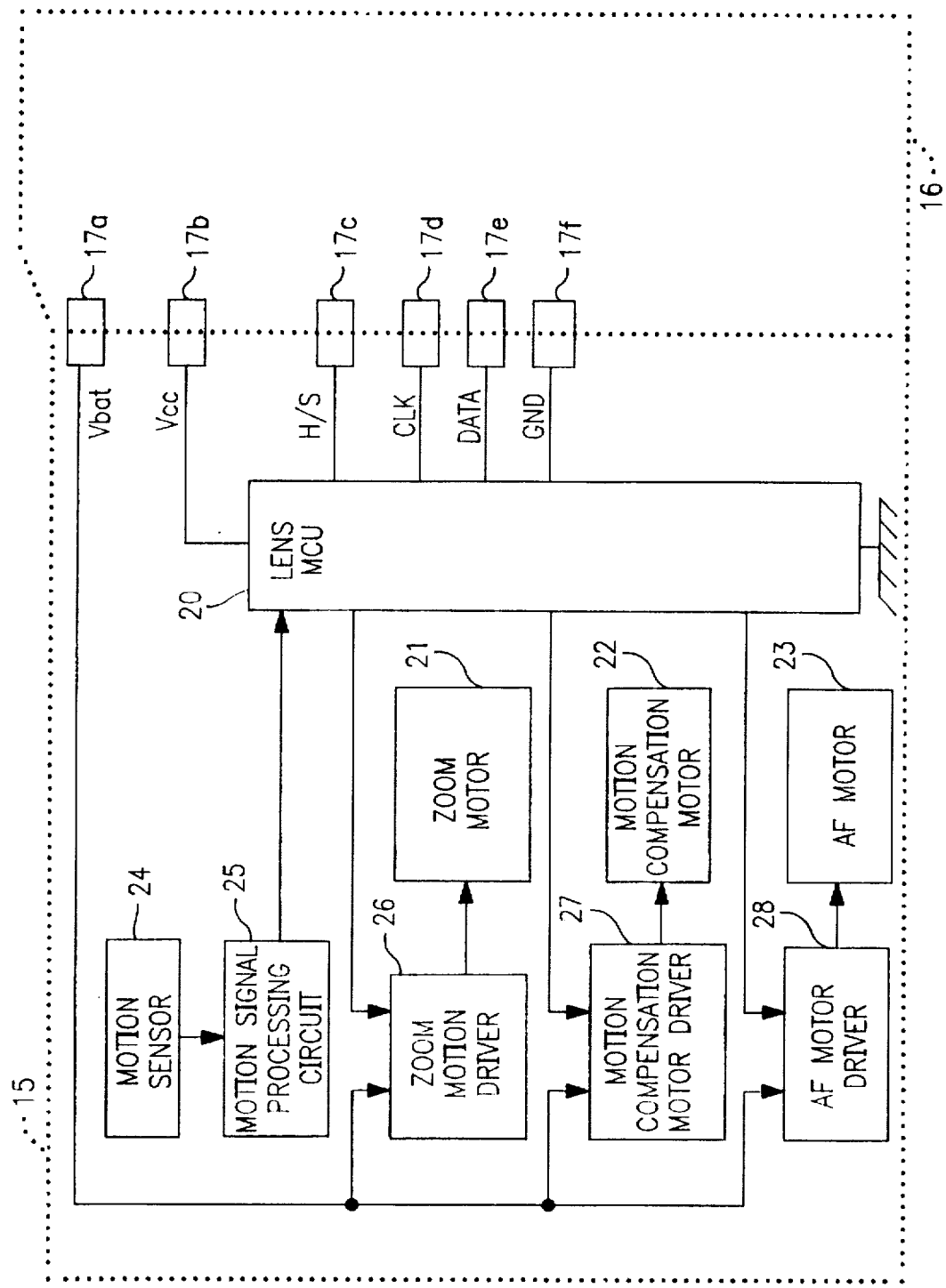
FIG. 5 is a block diagram illustrating a photographic lens and related camera system according to a preferred embodiment of the present invention.
Figure 6:
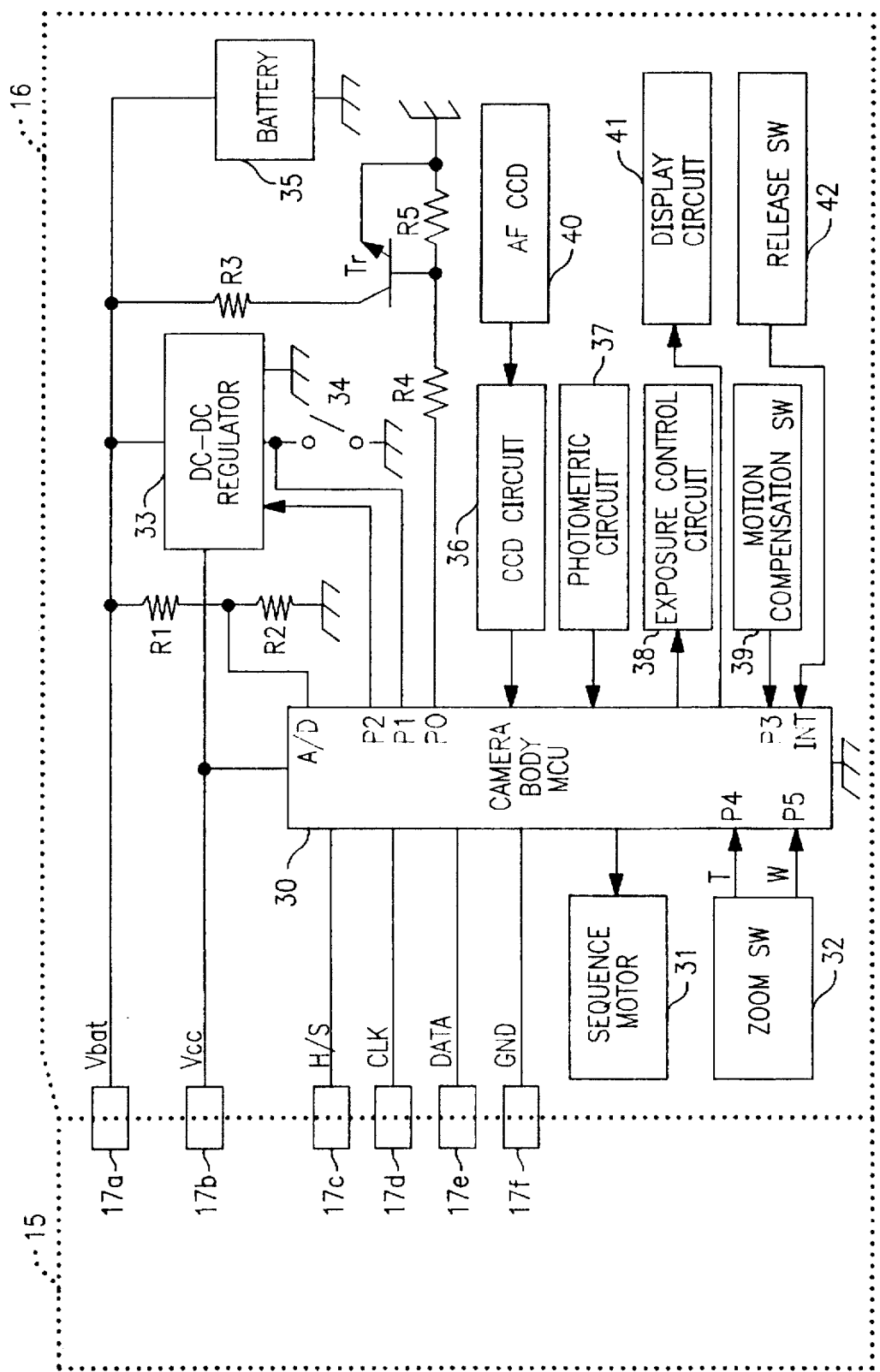
FIG. 6 is a block diagram illustrating a camera body and related camera system according to a preferred embodiment of the present invention.

FIGS. 5 and 6 illustrate photographic lens 15 and camera body 16 according to a preferred embodiment of the present invention. In the camera system illustrated in FIGS. 5 and 6, the camera system includes photographic lens 15 which is interchangeably mounted on camera body 16. Photographic lens 15 and the camera body 16 are connected via connection contacts 17a–17f.

In FIG. 5, photographic lens 15 is equipped with a lens microcomputer unit referred to as "lens MCU 20" hereinbelow, zoom motor 21, motion compensation motor 22, AF motor 23, motion sensor 24, motion signal processing circuit 25, zoom motor driver 26, motion compensation motor driver 27, AF motor driver 28, and the like.

Among connection contacts 17a–17f, connection contact 17a is connected to respective input terminals of zoom motor driver 26, motion compensation motor driver 27, and AF motor driver 28. Connection contact 17b is connected to the power supply input terminal of lens MCU 20 and connection contacts 17c–17f are connected to communication ports of lens MCU 20.

An output terminal of motion sensor 24 is connected to an input terminal of motion signal processing circuit 25 while an output terminal of motion signal processing circuit 25 is connected to a signal input terminal of lens MCU 20.

Lens MCU 20 is equipped with a central processing unit, program memory, and working memory. Lens MCU 20 performs communication with camera body 16 and performs drive control of zooming motor 21, motion compensation motor 22, and AF motor 23, along with other similar actuators.

In the working memory of MCU 20, data is disposed beforehand relating to the necessary power supply characteristics for driving of zooming motor 21, motion compensation motor 22, AF motor 23 and similar actuators.

In FIG. 6, camera body 16 is equipped with a camera body microcomputer unit "camera body MCU 30", sequence motor 31, a zoom switch "zoom SW 32", DC-DC regulator 33, a half depression switch "half depression SW 34", battery 35, CCD processing circuit 36, photometric circuit 37, exposure control circuit 38, a motion compensation switch "motion compensation SW 39", AF CCD40, display circuit 41, a release switch "release SW", and the like.

Camera body MCU 30 is equipped with a central processing unit, program memory and working memory. Camera body MCU 30, other than effecting the general operation of the camera, effects various operations relating to the present invention.

Contact point 17a is connected to a built-in power supply in the form of battery 35. The power supply voltage is Vbat. The line connecting contact point 17a and battery 35 is also connected to a power supply input terminal of DC-DC regulator 33.

The output terminal of the operating voltage Vcc which the DC-DC regulator generates is connected to the connecting contact 17b. Connecting contacts 17c–17f are connected to communication ports of camera body MCU 30.

Output port P2 of camera body MCU 30 is connected to a control input terminal of DC-DC regulator 33, while port P1 is connected to the ON/OFF changeover terminal of DC-DC regulator 33. Half depression switch 34, which is turned ON when the release button of the camera is half depressed, is connected between the ON/OFF changeover terminal of the DC-DC regulator 33 and ground.

The series circuit (voltage divider circuit) of resistors R1 and R2 is connected between ground and the line connecting contact point 17a to battery 35. The junction of resistors R1 and R2 is connected to conversion port A/D of camera body MCU 30. Camera body MCU 30 is able to recognize the power supply voltage Vbat.

Moreover, the line joining contact point 17a and battery 35 is connected, via resistor R3, to the collector of transistor Tr. The base of transistor Tr is connected, via resistor R4, to port P0 of camera body MCU 30, and is connected to ground via resistor R5. This transistor circuit is used for battery voltage measurement.

An output terminal of AF CCD 40 is connected to an input terminal of CCD circuit 36. Likewise, output terminals of CCD circuit 36 and photometric circuit 37 are respectively connected to corresponding signal input ports of camera body MCU 30. The input terminals of sequence motor 31, exposure control circuit 38, and display circuit 41 are respectively connected to corresponding signal output ports of camera body MCU 30.

The telephoto side changeover output terminal T of zoom SW 32 is connected to port P4 of camera body MCU 30 with the wide angle side changeover output terminal W of zoom SW 32 connected to port P5 of camera body MCU 30.

Moreover, the changeover output terminal of motion compensation SW 39 is connected to port P3 of camera body MCU 30, and the changeover output terminal of release SW 42 which is turned ON by full depression of the camera release button is connected to the interrupt output terminal INT of camera body MCU 30.

As set forth above, there is a corresponding relationship between the embodiments as illustrated in FIGS. 5 and 6 and the embodiments illustrated in FIGS. 1–4 as follows. Photographic lens 15 of FIGS. 5 and 6 corresponds to photographic lenses 1a and 1b of FIGS. 1–4, while zoom motor 21, motion compensation motor 22, and AF motor 23 of FIGS. 5 and 6 correspond to the photographic lens actuators of FIGS. 1–4.

Lens MCU 20 of FIG. 5 corresponds to memory 2, first transmission unit 3, first receiving unit 4, first determination unit 5, and second transmission unit 6 of FIGS. 1 and 2. Camera body 16 of FIG. 6 corresponds to camera bodies 7a and 7b of FIGS. 1 and 2 with battery 35 of FIG. 6 corresponding to the built-in power supplies of FIGS. 1–4. Camera body MCU 30 of FIG. 6, as a whole, corresponds to transistor Tr, and resistors R3, R4, R5 in power supply characteristics measurement unit 9.

Likewise, camera body MCU 30 of FIG. 6 corresponds to power supply data accumulation unit 8, second determination unit 10, third transmission unit 11, second receiving unit 12, and first and second timing adjustment units in reference to FIGS. 1–4. Display circuit 41 and camera body MCU 30 as a whole (in FIG. 6) correspond to the first and second display units of FIGS. 1–4 (not shown). Sequence motor 31 corresponds to an actuator in the camera body.

Figure 7:
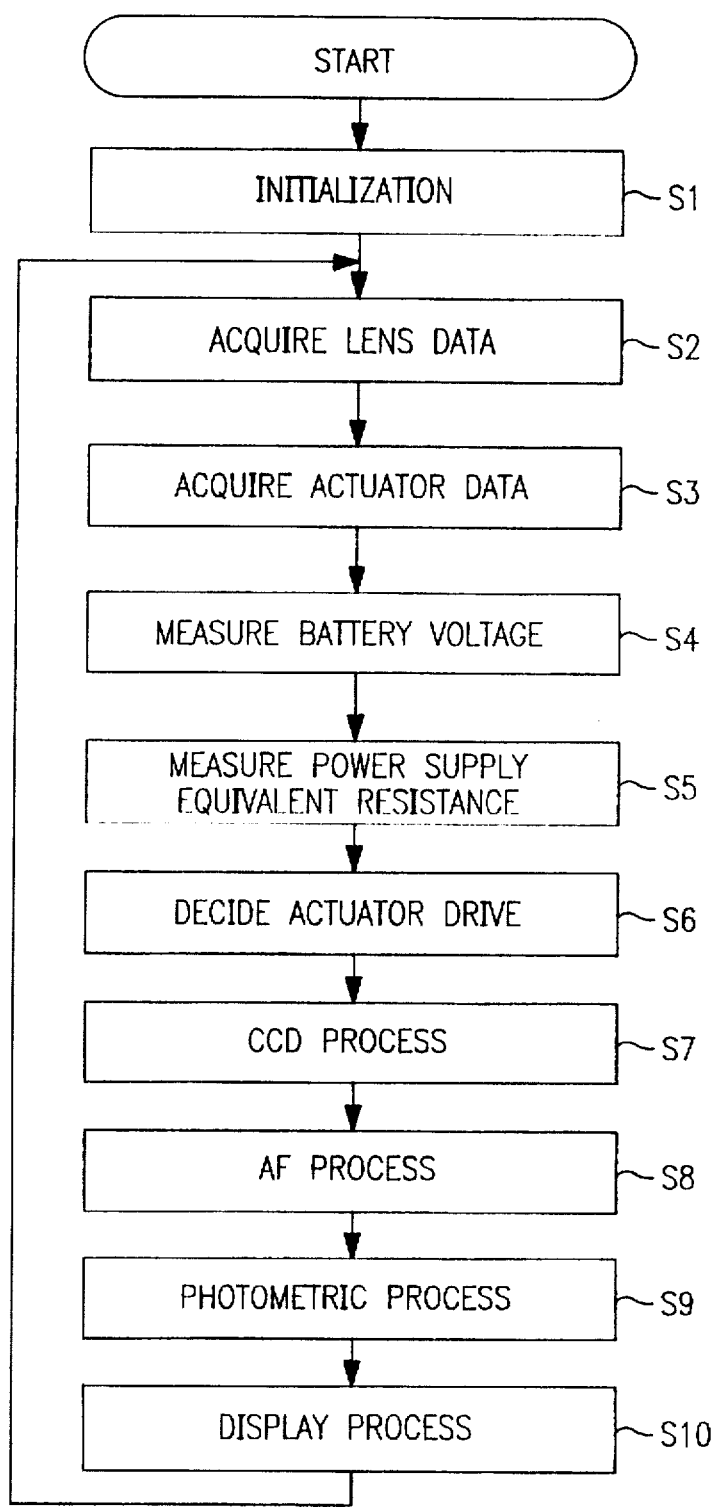
FIG. 7 is a main flow chart of a camera body MCU according to a preferred embodiment of the present invention.

Next, FIG. 7 illustrates a preferred embodiment of the present invention. FIG. 7 is a main flow chart illustrating the operation of camera body MCU 30 illustrated in FIG. 6. In FIG. 7, step S1 begins an initialization of the camera in which a number of initializations are performed. The initializations include clearing the working memory, setting the interval timer, setting up serial communication, setting an appropriate mode, and the like.

In step S2, communication setup is performed for lens MCU 20 (see FIG. 9), which is to acquire the necessary lens characteristic data relating to the automatic exposure control (abbreviated hereinbelow as "AE"), the automatic focus control (abbreviated hereinbelow as "AF"), and the like. In step S3, lens MCU 20 communicates and acquires actuator data relating to the present invention (see FIG. 10).

Figure 13:
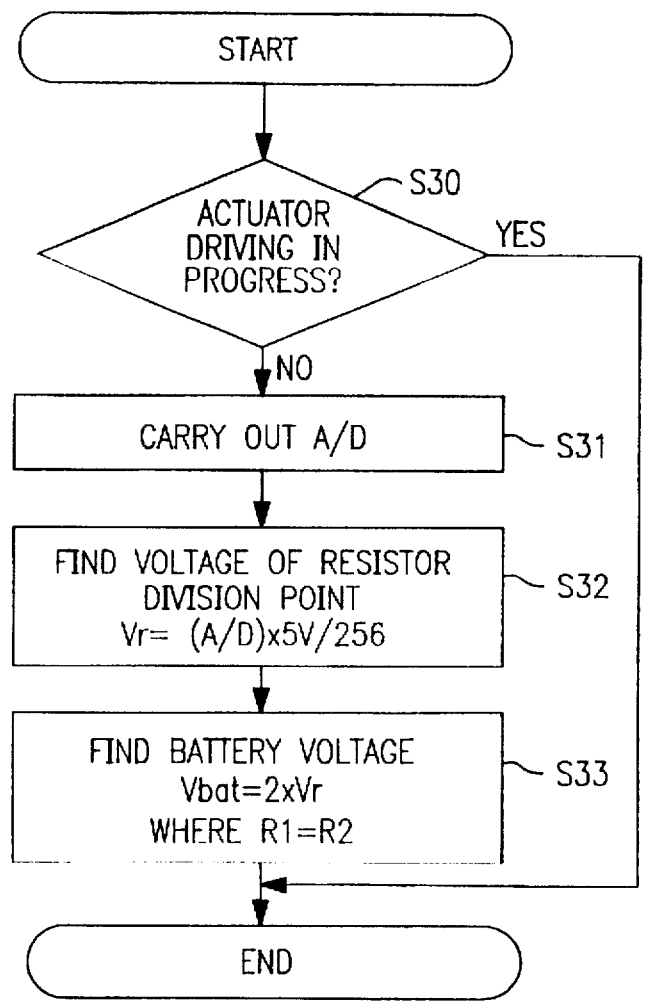
FIG. 13 is a flow chart illustrating battery voltage measurement according to a preferred embodiment of the present invention.

In step S4, the voltage of built-in power supply battery 35 of camera body 16 is measured (see FIG. 13). In step S5, the power supply equivalent output resistance of battery 35 is measured (see FIG. 14). In step S6, a determination is performed relating to the drive of the actuators from the capability of battery 35 and the obtained actuator data (see FIGS. 15–29).

Then, the CCD process (step S7) which performs the motion compensation, the AF process (step S8) which performs AF calculation, i.e. the parallel AF drive determination (see FIGS. 30 and 31), the photometric process (step S9), and the display process (step S10) as illustrated in FIGS. 30–41, are performed in sequence. Returning to step S2, the following similar process is repeated.

Moreover, the zoom operation and the motion compensation operation are started as necessary within the interval timer interruption process. The release operation is started in the interrupt release routine by changing a level of an external interrupt terminal at the ON operation of release SW 42.

Moreover, by communication with photographic lens 15, the operations of each line are performed, such as handshake control signal H/S, clock CLK, and data DATA. Then, in communication with the photographic lens, examples of communication commands are expressed in hexadecimal format, 27H, 29H, 30H, 31H, 32H, 33H, 34H, 35H, and the like, to define each kind of command.

In FIG. 8, "27H" is a command to acquire AE data, AF data and similar lens data; there are 0 transmitted data and 40 received data. "29H" is a lens actuator drive limit acquisition command; there are 0 transmitted data and 6 received data.

"30H" is a zoom drive command; there is 1 transmitted data and 0 received data. "31H" is a zoom inhibit command; there are 0 transmitted data and 0 received data.

"32H" is an AF drive command; there are 3 transmitted data and 0 received data. "33H" is an AF inhibit command; there are 0 transmitted data and 0 received data.

"34H" is a motion compensation drive command; there are 0 transmitted data and 0 received data. "35H" is a motion compensation inhibit command; there are 0 transmitted data and 0 received data.

Each process of steps S1–S10 is specifically described hereinbelow. First, the lens data acquisition process and actuator data acquisition process will be described with reference to FIGS. 9–11.

Figure 9:
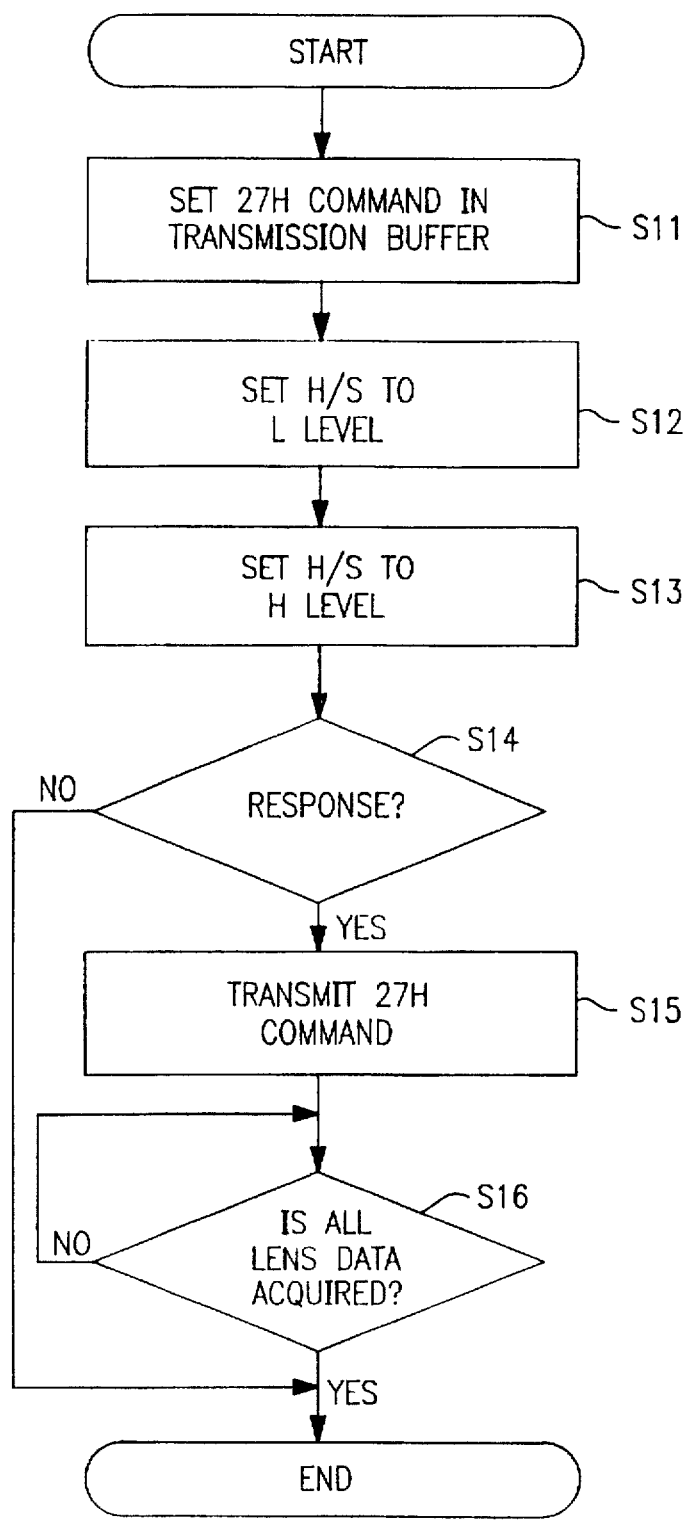
FIG. 9 is a flow chart of lens data acquisition according to a preferred embodiment of the present invention.
Figure 10:
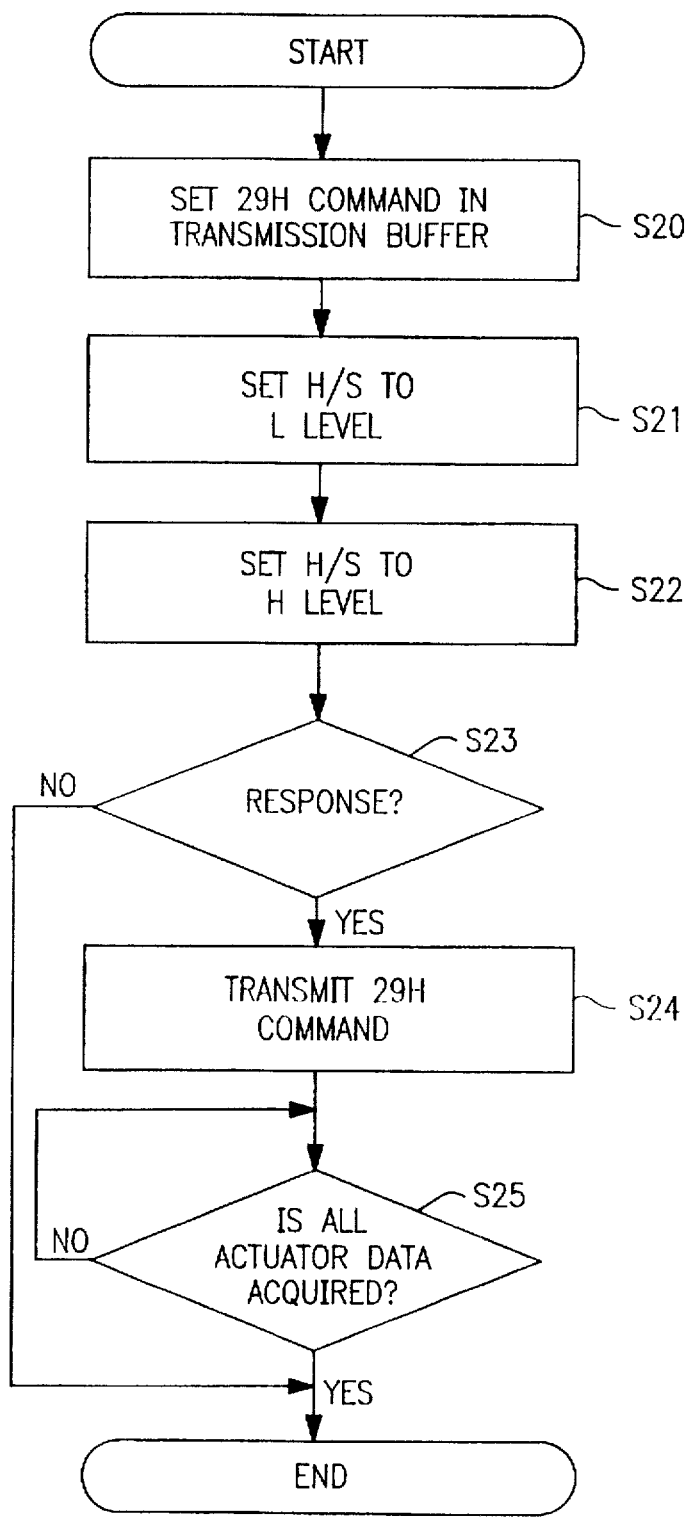
FIG. 10 is a flow chart of actuator data acquisition according to a preferred embodiment of the present invention.

FIG. 9 is a flow chart of the lens data acquisition of step S2 in FIG. 7. FIG. 10 is a flow chart of the actuator data acquisition of step S3 in FIG. 7 while FIG. 11 is a timing chart of the data acquisition from the photographic lens 15.

The lens data acquisition of step S2 in FIG. 7 is performed as follows. In FIG. 9 and FIG. 11, the camera body MCU 30 in step S11, sets a 27H command in a buffer. Next, in step S12 the level of the H/S line connected to photographic lens 15 is set to "L", and communication to the lens MCU 20 (FIG. 11(a)) is started.

Next, in step S13, after a suitable time, the level of the H/S line connected to the photographic lens 15 is set to the "H" level, while step S14 monitors whether or not the H/S line from the photographic lens 15 has become the "L" level, and obtains a response from lens MCU 20 (FIGS. 11(a), (b)).

When the level of the H/S line from the photographic lens 15 is "L", the decision result in step S14 becomes affirmative (YES), and the routine proceeds to step S15. The 27H command (DATA) is then taken from the transmission buffer, and is serially transmitted together with a clock signal CLK.

Then, because camera body MCU 30 transmits a clock signal of a predetermined number of pulses of 1 data segment on the CLK line while confirming the level of the H/S line from the photographic lens 15, the lens MCU 20 can serially transmit a predetermined 1 lens data (DATA) synchronized with this clock signal.

In the next step S16, it is determined whether or not the lens data which was input as above is the last lens data. If the decision result is negative, i.e. the lens data is not the last data (NO), a predetermined number of pulses of 1 data segment are serially transmitted to the CLK line the clock signal, and the action of causing serial transmission of 1 lens data to lens MCU 20 (FIG. 11(c), (d)) is serially performed.

When the determination result of step S16 becomes affirmative (YES), i.e. that the final lens data is acquired, this routine ends. As set forth above, by the 27H command the data number (DATAn) which camera body MCU 30 receives is 40 (see FIG. 8).

Moreover, in step S14, in the case that there is no response, because it is the case that the photographic lens 15 is not mounted, and the like, the determination becomes negative (NO), and this routine ends.

In the lens data acquired by the above routine, there is exit pupil position data, an aperture F value signal, an image surface movement conversion coefficient, an amount A' of linear aberration, absolute distance data, absolute distance error data, focal distance, a maximum stop value, CPU version, flag data representing whether the camera has power zoom, flag data representing whether the camera has AF, flag data representing whether the camera has motion compensation, and the like.

Next, the actuator data of step S3 in FIG. 7 is acquired as follows. In FIG. 10 and FIG. 11, and in reference to step S20, camera MCU 30 sets the 29H command in the transmission buffer. In the next step S21, the H/S line connected to photographic lens 15 is set to the level "L", and communication to lens MCU 20 (FIG. 11(a)) is initiated.

Next, in step S22, after a suitable time, the H/S line connected to photographic lens 15 is set to an "H" level, and step S23 monitors whether the H/S line from the photographic lens 15 goes to the "L" level, and a response is obtained from lens MCU 20 (FIGS. 11(a), (b)).

When the H/S line from photographic lens 15 is at the "L" level, a determination result of step S23 becomes affirmative (YES), and in step S24, the 29H command (DATA) is extracted from the transmission buffer, and is serially transmitted together with a clock signal CLK.

Then, because camera body MCU 30 transmits the clock signal of a predetermined number of pulses of 1 data segment on the CLK line, while confirming the level of the H/S line from the photographic lens 15, lens MCU 20 can serially transmit a predetermined 1 segment of actuator data (DATA) simultaneously with this clock signal.

In the next step S25, it is determined whether the acquired actuator data is the final data. If the acquired data is not the final data, the determination result becomes negative (NO), a clock signal of a predetermined number of pulses of 1 data segment is transmitted on the CLK line, and a repetition of the operation is performed, causing 1 actuator data (DATA) to be serially transmitted to lens MCU 20 (FIG. 11(c), (d)).

When the result of the determination of step S25 becomes affirmative (YES), indicating that the final actuator data has been acquired, this routine ends. As set forth above, the data number (DATAn) which the camera body MCU 30 receives by the 29H command is 6 (see FIG. 8).

Moreover, in step S23, in the case that there is no response, because it is a case in which the photographic lens 15 is not mounted, etc., the determination becomes negative (NO), and this routine ends.

The actuator data obtained in the above routine, in the present mode of embodiment, is data relating to the power supplies to zoom motor 21, motion compensation motor 22, and AF motor 23 (data of lower action limit necessary for actuator driving).

Figure 12:
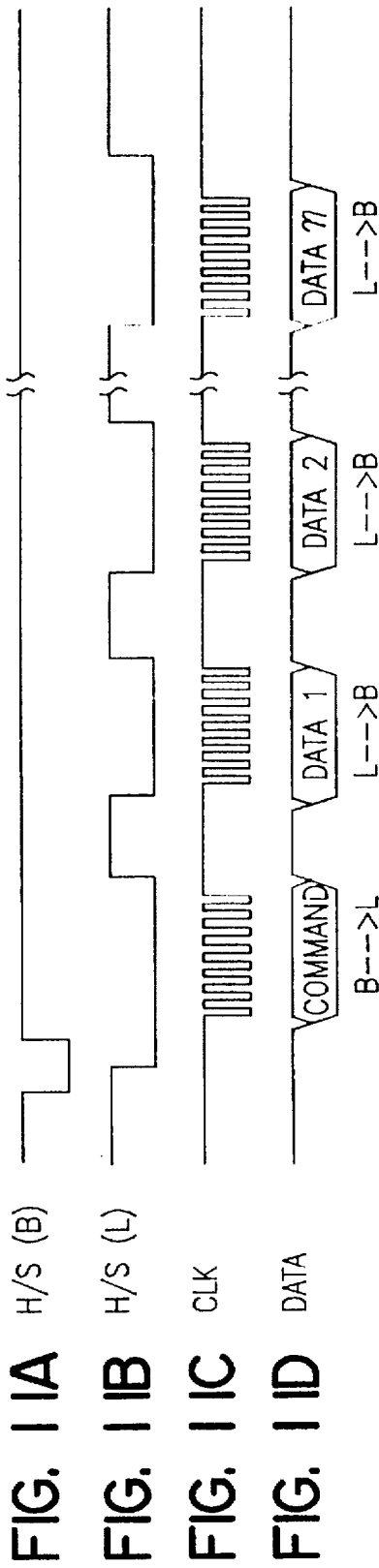
FIG. 12 is a table of data relating to power supply characteristics of photographic actuators according to a preferred embodiment of the present invention.

FIG. 12 is an example of data relating to power supply characteristics of an actuator.

Next, FIG. 13 is a flow chart of a battery voltage measurement of step S4 of FIG. 7. In FIG. 13, step S30, it is determined whether driving of the actuator is in progress. If the determination result is affirmative (YES), driving is in progress and this routine ends. The battery voltage is not measured during driving.

If driving of the actuator is not in progress, the determination result of step S30 is negative (NO) and, proceeding to step S31, the digital value is found of the partial voltage impressed on the converter port A/D. In step S32, the potential Vr of the resistance division point is found from this digital value by calculating Vr=(A/D value)×5 V/256. In step S33 the voltage Vbat of the battery 35 is found by calculating Vbat=2×Vr. In this case, the resistors R1 and R2 have the same value.

Figure 14:
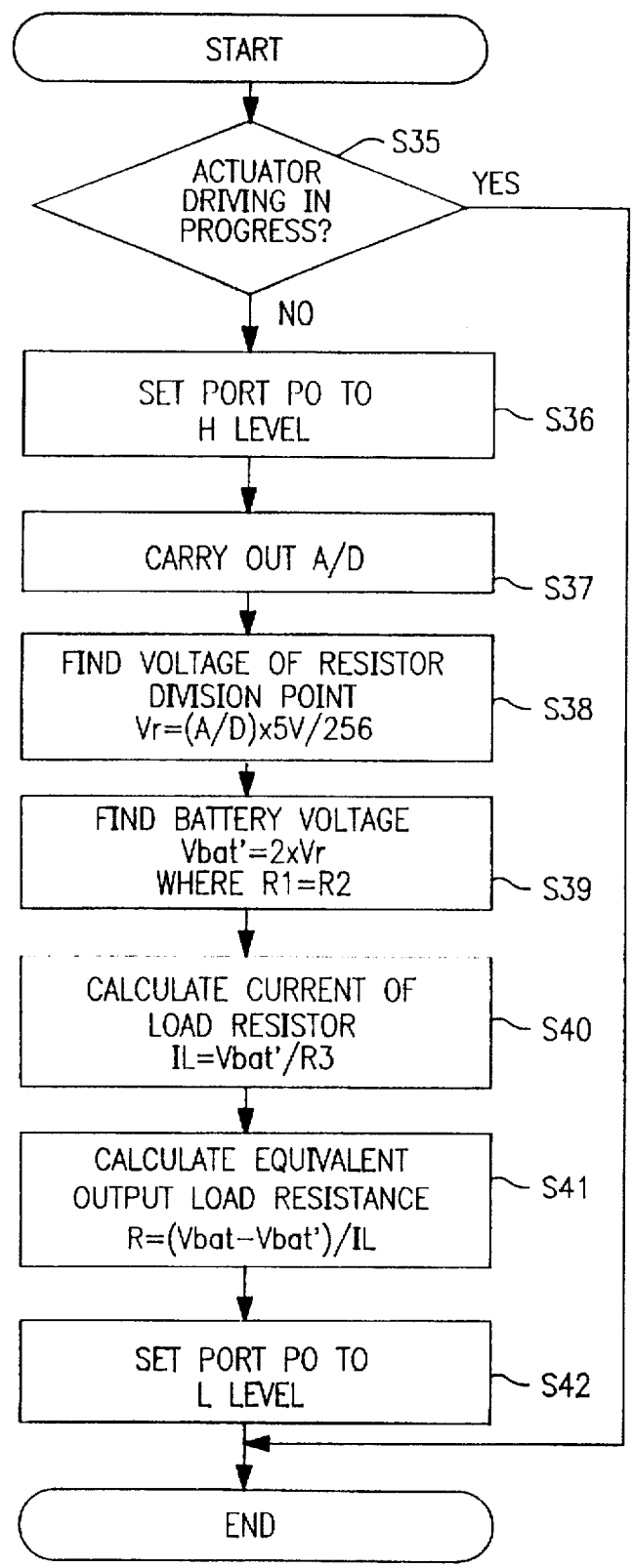
FIG. 14 is a flow chart illustrating power supply equivalent resistance measurement according to a preferred embodiment of the present invention.

Next, FIG. 14 is a flow chart of the power supply equivalent resistance measurement of step S5 in FIG. 7. In FIG. 14, step S35, it is determined whether driving of the actuator is in progress. If driving of the actuator is in progress, the determination result is affirmative (YES), and this routine ends. The power supply equivalent resistance is not measured while the power supply is driving.

If driving of the actuator is not in progress, when the determination result of step S35 is negative (NO), flow proceeds to step S36 and port P0 is made an "H" level. Thereupon, the transistor Tr is turned ON, resistor R3, of a comparatively low resistance (for example, about 10Ω), is applied as the load of battery 35, and the partial value of the new battery voltage Vbat' is impressed on the conversion port A/D.

Consequently, A/D conversion is quickly performed in step S37, and in steps S38 and S39, the potential Vr of the resistance division point and the battery voltage Vbat' are found. In step S40, the current IL flowing through resistor R3, which serves as a load resistor, is calculated, and in step S41 the equivalent output resistance R of the power supply is calculated from the load current and from the change of the power supply voltage due to this incremental current.

After this, in step S42, port P0 is set to an L level by mining transistor Tr OFF, and this routine ends.

Figure 15:
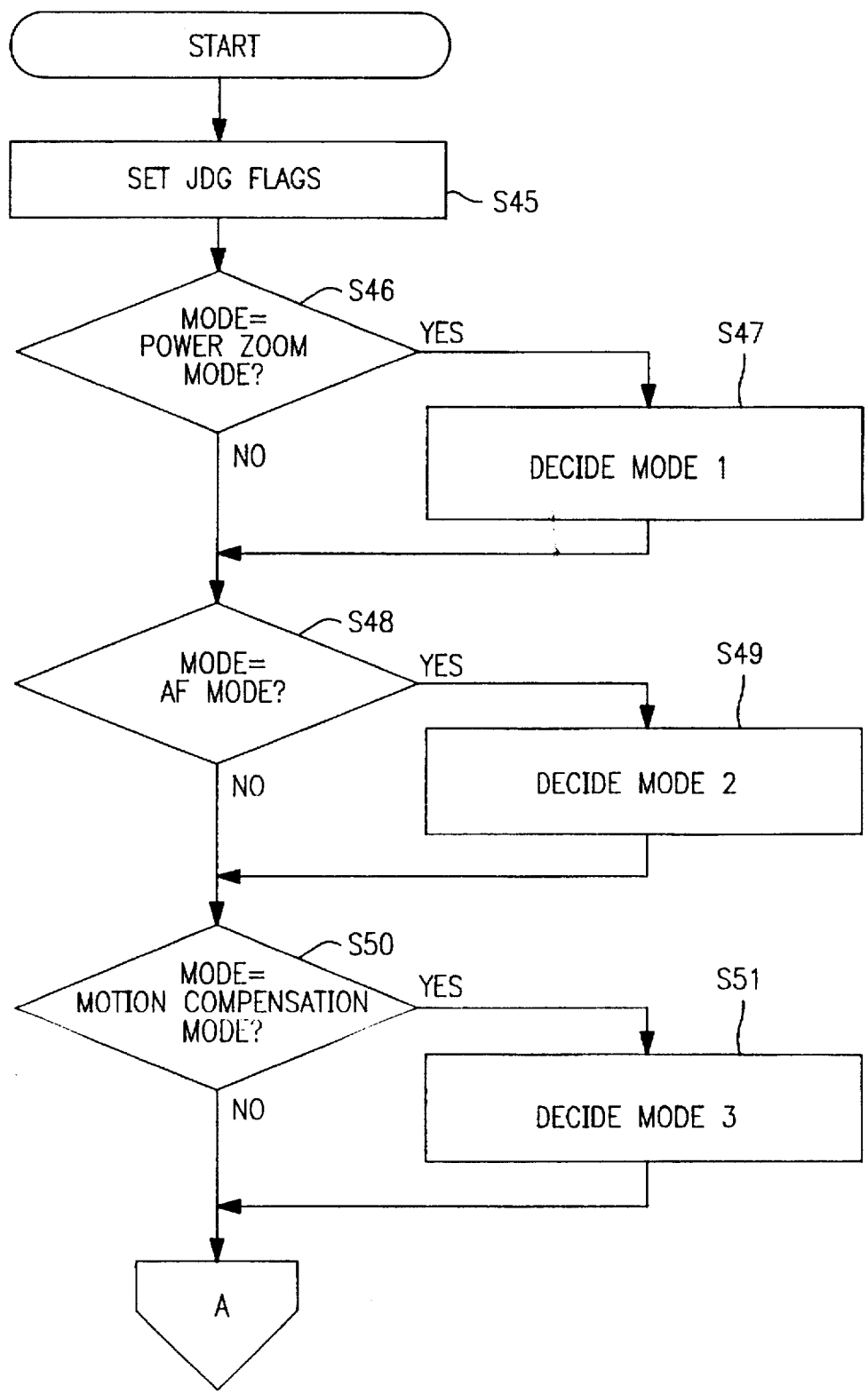
FIG. 15 is a flow chart of actuator drive decision according to a preferred embodiment of the present invention.
Figure 16:
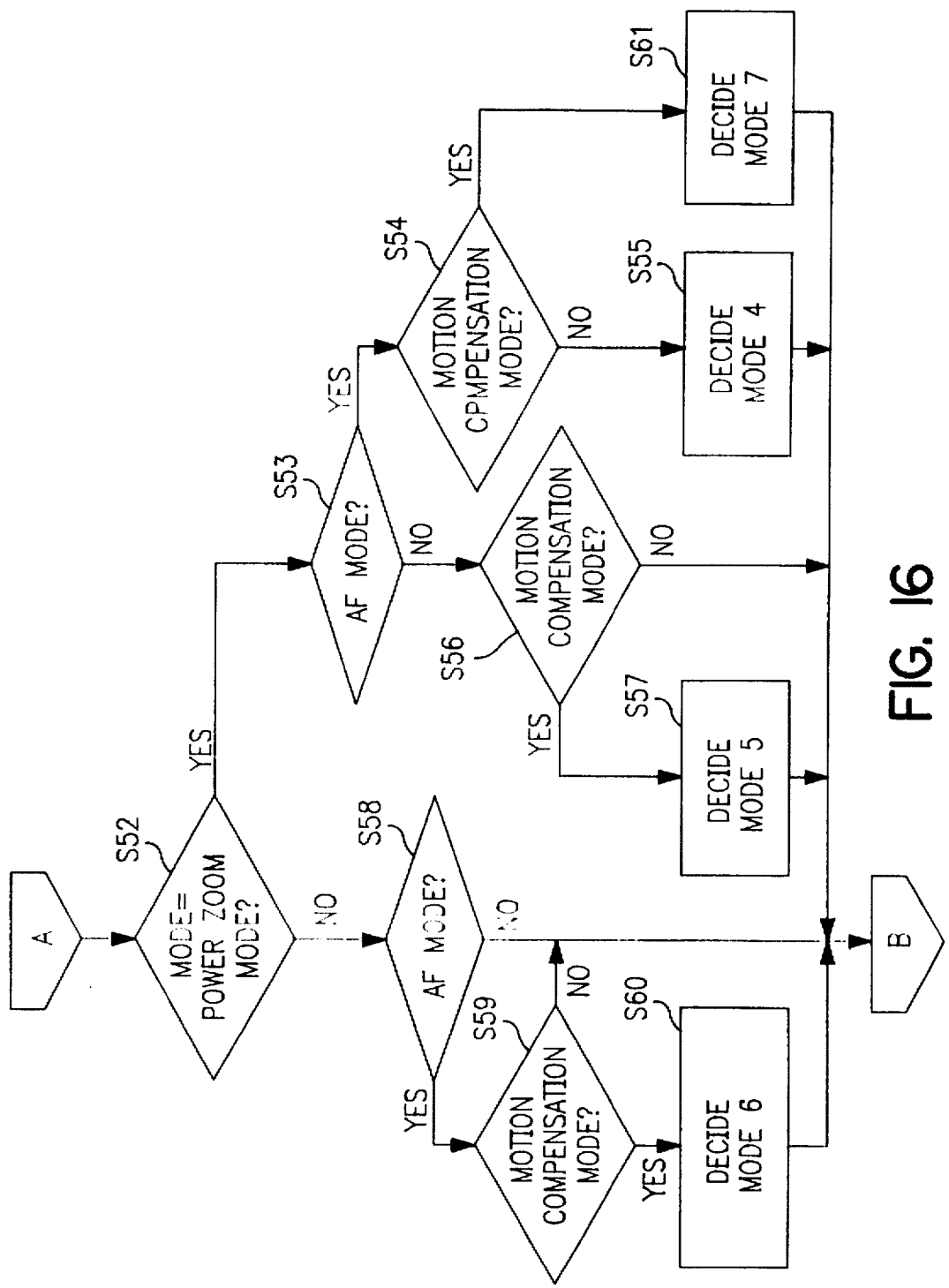
FIG. 16 is a flow chart illustrating an actuator drive decision according to a preferred embodiment of the present invention.
Figure 17:
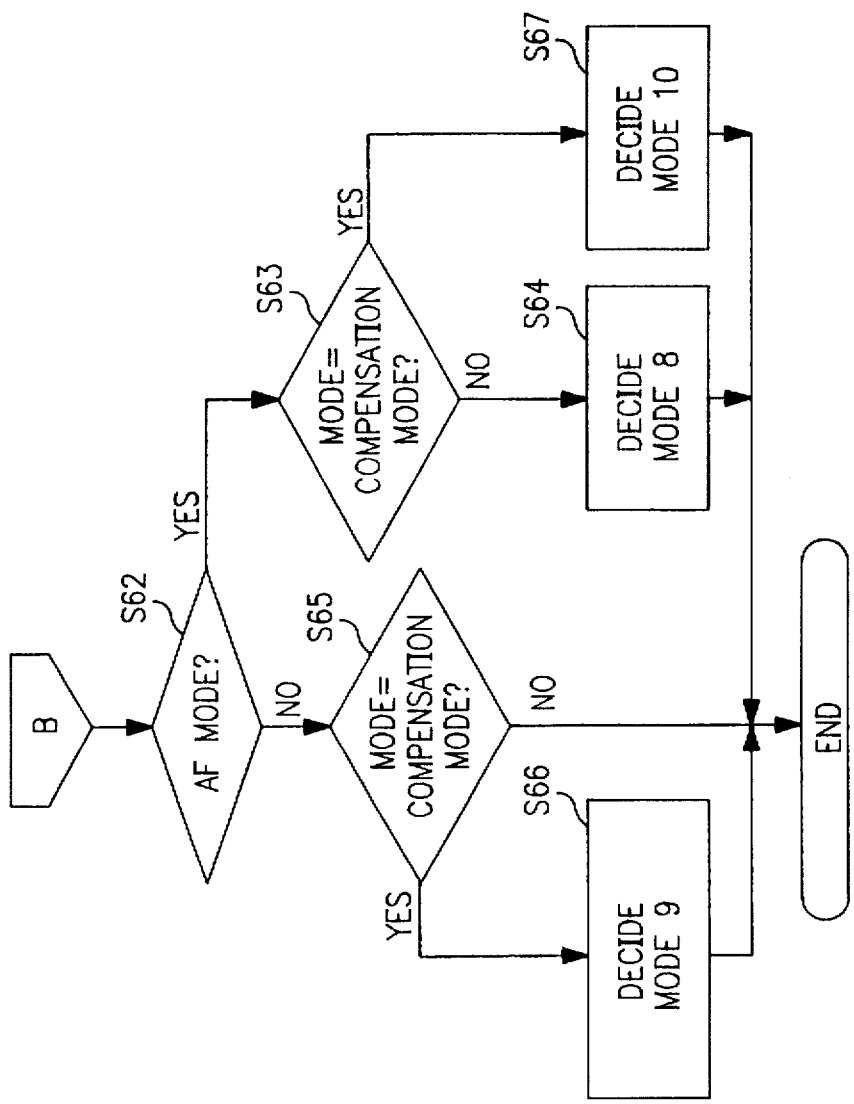
FIG. 17 is a flow chart illustrating an actuator drive decision according to a preferred embodiment of the present invention.

Next, FIGS. 15–17 represent a flow chart of the actuator drive determination of step S6 in FIG. 7. FIGS. 18 and 19 are relationship tables of the actuators and the decision modes. 10 kinds of decision modes (MODE 1–MODE 10) and the corresponding 10 decision flags (JDG 1–JDG 10) are set.

Namely, MODE 1–MODE 3 are each an independent decision of an actuator (FIG. 15), MODE 4–MODE 7 are decisions of a case in which the plural actuators in the photographic lens compete, and MODE 8–MODE 10 are decisions in the case that the plural actuators in the photographic lens and the camera body compete (FIG. 17).

The drive decision in each decision mode (MODE 1–MODE 10) is performed according to the routines shown in FIGS. 20–29. In each actuator drive decision, because power supply characteristics (FIG. 12) of a photographic lens are included in the lens data acquired by communication with the photographic lens, actuator drive is performed with reference to the power supply characteristics.

Moreover, the interrupt process is as an inhibition in the course of the actuator drive decision of the step S6 in FIG. 7. This interval timer interruption avoids mistakes due to reference during the determination, because it refers to the result of this actuator driving determination within the release interruption process routine.

In FIG. 15, step 45, the decision flags JDG 1–JDG 10 are respectively set to "1". Then, in step S46, it is determined whether the current mode is a power zoom mode.

Figure 20:
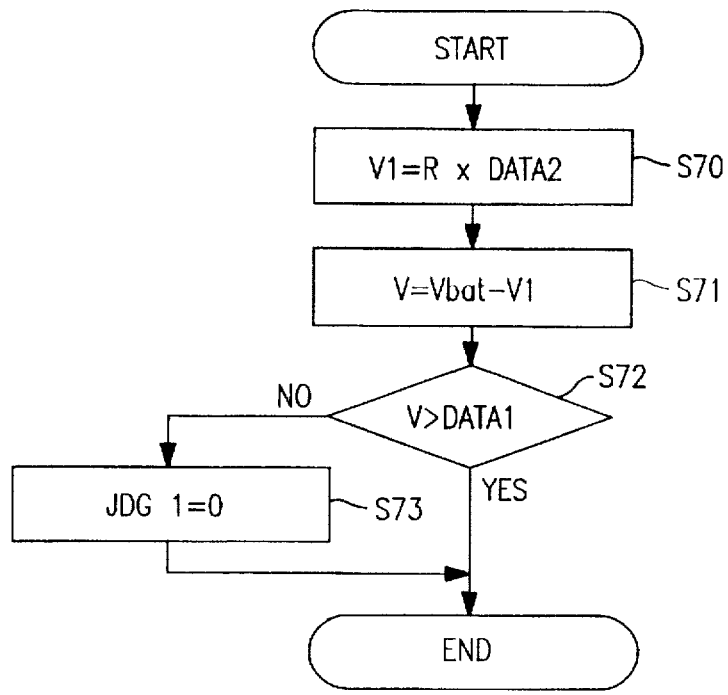
FIG. 20 is a flow chart of a MODE 1 decision according to a preferred embodiment of the present invention.

If the mounted photographic lens is a power zoom corresponding lens, the decision result in step S46 is affirmative (YES), a MODE 1 decision is performed in step S47, and the routine proceeds to step S48. The specific process sequence of the MODE 1 decision of step S47 is mentioned hereinbelow (FIG. 20). On the other hand, if the mounted lens is not a power zoom lens, the decision result of step S46 becomes negative (NO), and the routine proceeds to step S48.

In step S48, it is decided whether the current mode is the AF mode. The photographic lens must at least be capable of AF for the current mode to be the AF mode. Moreover, there may be an AF, MF selection unit on the camera body side.

Figure 21:
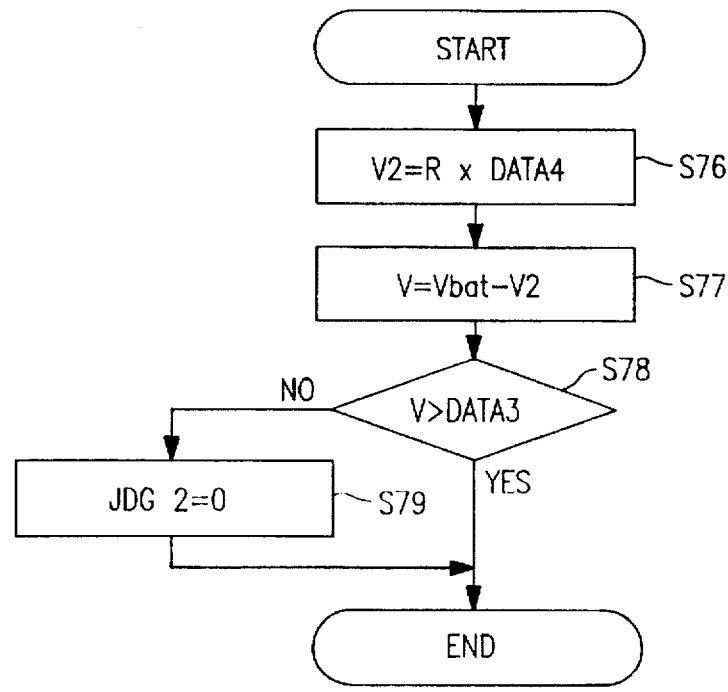
FIG. 21 is a flow chart of a MODE 2 decision according to a preferred embodiment of the present invention.

If the current mode is the AF mode, the decision result of step S48 becomes affirmative (YES), the MODE 2 decision is performed in step S49, and the routine proceeds to step S50. A specific process sequence of the MODE 2 decision of step S49 is mentioned hereinbelow (FIG. 21). On the other hand, if the current mode is not the AF mode, the decision result in step S48 becomes negative (NO), and the routine proceeds to step S50.

Step S50 decides whether the current mode is the motion compensation mode. A prerequisite for the motion compensation mode is that a photographic lens is mounted which has a motion compensation function. Moreover, if the motion compensation switch 39 is OFF, the motion compensation mode is not set.

Figure 22:
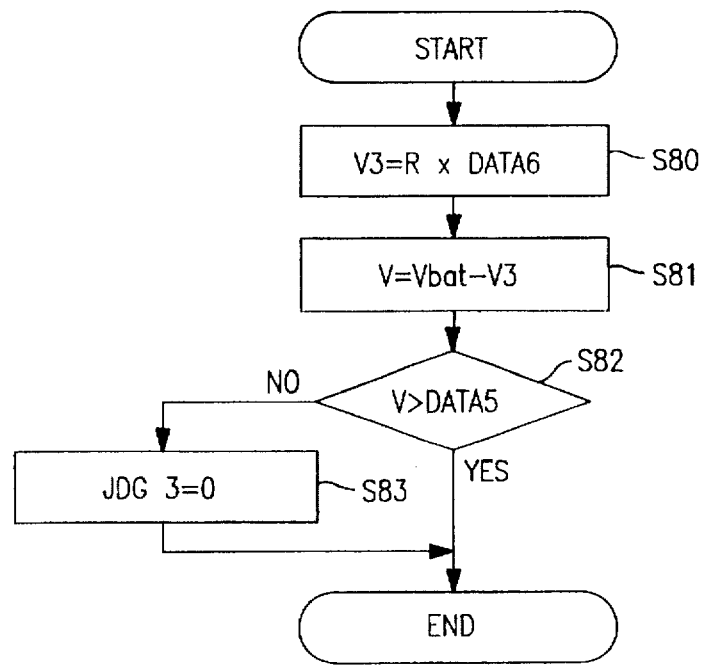
FIG. 22 is a flow chart of a MODE 3 decision according to a preferred embodiment of the present invention.

If the current mode is the motion compensation mode, the decision result of step S50 becomes affirmative (YES), a MODE 3 decision is performed in step S51, and the routine proceeds to step S52 (FIG. 16). A specific process sequence of the MODE 3 decision of step S51 is mentioned hereinbelow (FIG. 22). On the other hand, if the current mode is not the motion compensation mode, the decision result of step S50 is negative (NO), and the routine proceeds to step S52 of FIG. 16.

Next, in FIG. 16, step S52, it is decided whether the current mode is the power zoom mode. If the current mode is the power zoom mode, a decision result of step S52 becomes affirmative (YES), flow proceeds to step S53, and it is decided whether the current mode is the AF mode. If the current mode is the AF mode, the decision result of step S53 becomes affirmative (YES), flow proceeds to step S54, and it is decided whether the current mode is the motion compensation mode.

If step S54 is not the motion compensation mode, the decision result of step S54 becomes negative (NO), the MODE 4 decision is performed in step S55, and the routine proceeds to step S62 in FIG. 17. That is, the decision of MODE 4, as illustrated in FIG. 18, is one performed in a case that the drive requirements of the two modes, zoom and AF, compete. A specific process sequence is mentioned hereinbelow (FIG. 22).

Next, if the current mode is not the AF mode in step S53, the decision result of step S53 becomes negative (NO), flow proceeds to step S56, and it is determined whether the current mode is the motion compensation mode. If the current mode is the motion compensation mode, the decision result of step S56 becomes affirmative (YES), the MODE 5 decision is performed in step S57, and the routine proceeds to step 62 illustrated in FIG. 17. Moreover, if the current mode is not the motion compensation mode, the decision result in step S56 becomes negative (NO), and the routine similarly proceeds to step 62 illustrated in FIG. 17.

Figure 24:
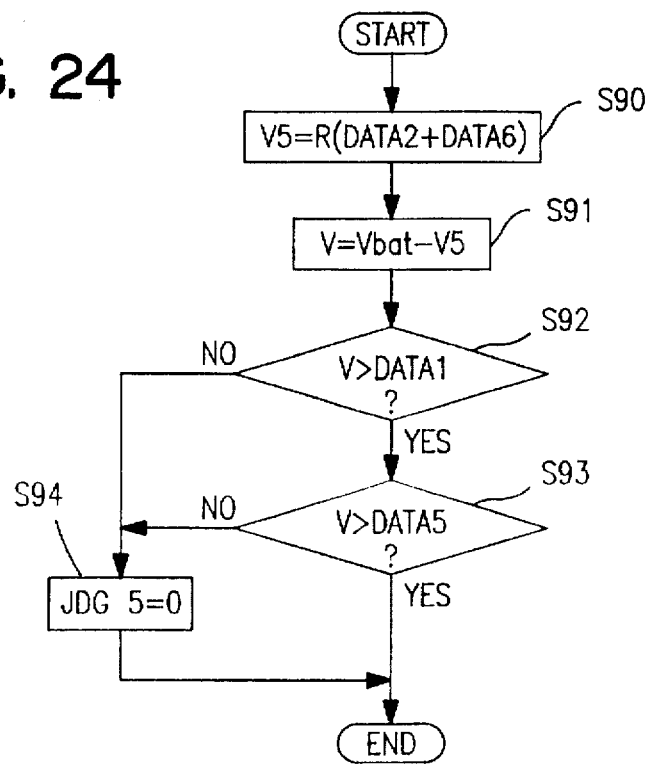
FIG. 24 is a flow chart of a MODE 5 decision according to a preferred embodiment of the present invention.

That is, the decision of MODE 5, as illustrated in FIG. 18, is performed in the case in which the driving requirements of the zoom mode and motion compensation mode compete, and a specific process sequence is mentioned hereinbelow (FIG. 24).

Next, when in step S52 the current mode is not the power zoom mode and the decision result becomes negative (NO). In step S58 it is determined whether the mode is the AF mode. If the decision result in step S58 is negative (NO), the routine proceeds to step S62 shown in FIG. 17. On the other hand, if the decision result in step S58 is affirmative (YES), flow proceeds to step S59 and it is determined whether the mode is the motion compensation mode.

If in step S59 the current mode is the motion compensation mode, the decision result of step S59 becomes affirmative (YES), the MODE 6 decision is performed in step S57, and the routine proceeds to step 62 shown in FIG. 17. On the other hand, if the current mode is not the motion compensation mode, the decision result in step S59 becomes negative (NO), and the routine similarly proceeds to step 62 shown in FIG. 17.

Figure 25:
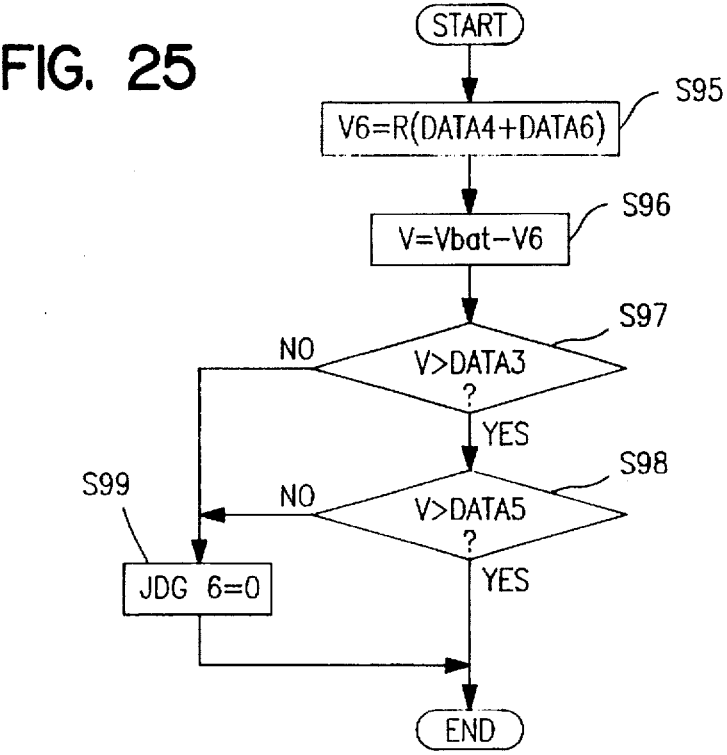
FIG. 25 is a flow chart of a MODE 6 decision according to a preferred embodiment of the present invention.

That is, the decision of MODE 6 as shown in FIG. 18 is performed in the case in which the driving requirements of the AF mode and the motion compensation mode compete, and a specific process sequence is mentioned hereinbelow (FIG. 25).

Figure 26:
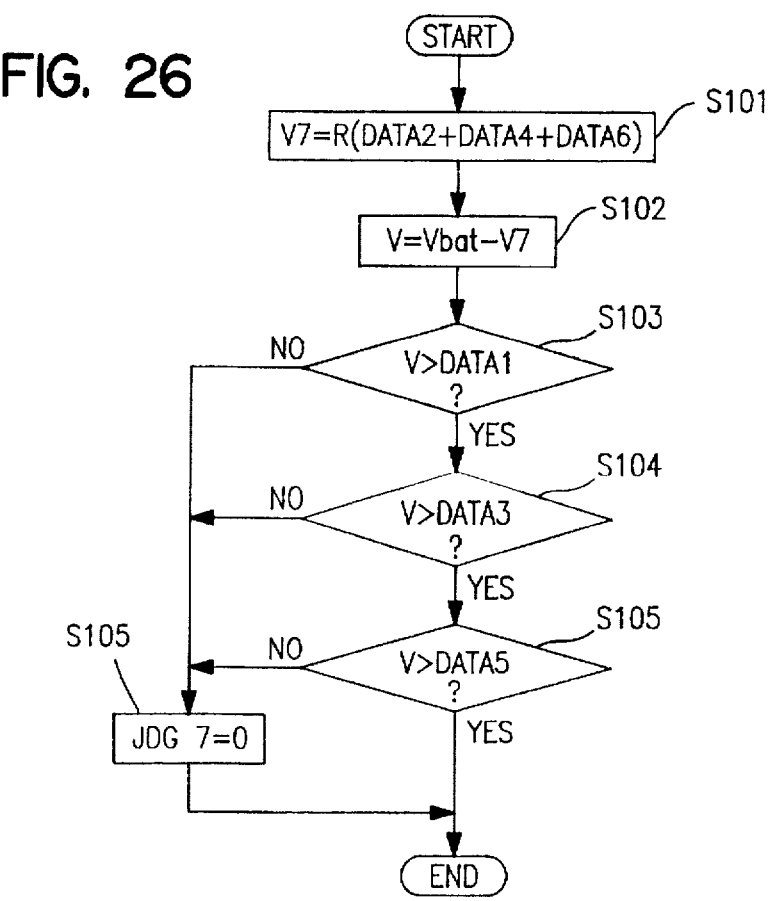
FIG. 26 is a flow chart of a MODE 7 decision according to a preferred embodiment of the present invention.

Next, if the current mode is the motion compensation mode in step S54, the decision result of step S54 becomes affirmative (YES), the MODE 7 decision is performed in step S61, and the routine proceeds to step S62 in FIG. 17. That is, the decision of MODE 7, as shown in FIG. 18, is one performed in a case that the drive requirements of the three modes, zoom, AF, and motion compensation, compete, and a specific process sequence is mentioned hereinbelow (FIG. 26).

Next, FIG. 17 illustrates a routine of the drive decision of the actuator at the time of the release operation. That is, FIG. 17 illustrates a process in which the actuator driving requirements on the two sides, the camera body and the photographic lens, compete.

In FIG. 17, step S62, it is decided whether the current mode is the AF mode. If the current mode is the AF mode, the decision result of step S62 becomes affirmative (YES), flow proceeds to step S63, and it is determined whether the current mode is the motion compensation mode.

Figure 27:
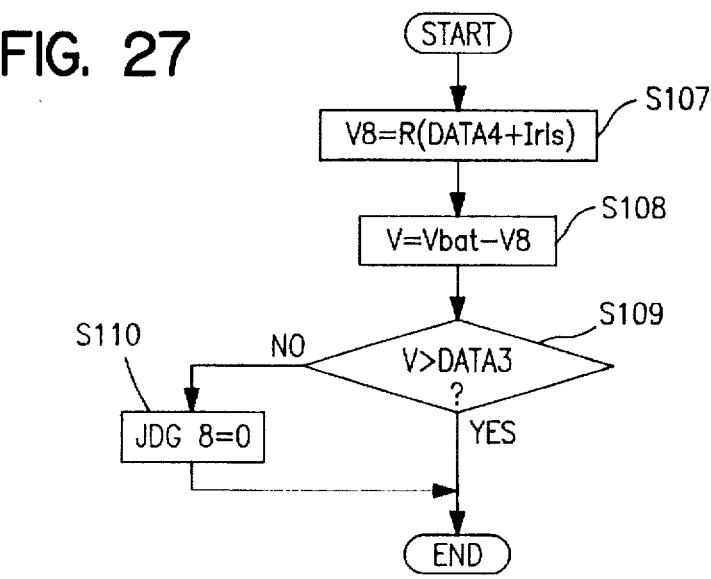
FIG. 27 is a flow chart of a MODE 8 decision according to a preferred embodiment of the present invention.

If in step S63 the current mode is not the motion compensation mode, the decision result of step S63 becomes negative (NO), the MODE 8 decision is performed in step S64, and the routine ends. That is, the decision of MODE 8, as illustrated in FIG. 19 is performed in the case in which the driving requirements of the release mode and the AF mode compete, and a specific process routine is mentioned hereinbelow (FIG. 27).

Next, if the current mode is not the AF mode in step S62, a decision result of step S65 becomes negative (NO), flow proceeds to step S65, and it is determined whether the current mode is the motion compensation mode. If the current mode is the motion compensation mode, the decision result of step S65 becomes affirmative (YES), the MODE 9 decision is performed in step S66, and the routine ends.

Figure 28:
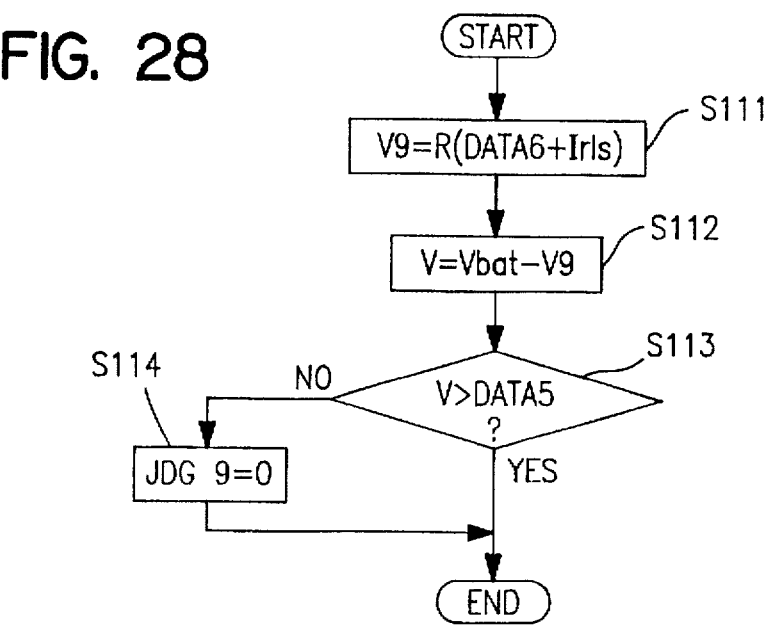
FIG. 28 is a flow chart of a MODE 9 decision according to a preferred embodiment of the present invention.

That is, the decision of MODE 9, as illustrated in FIG. 19, is performed in the case in which the driving requirements of the release mode and the motion compensation mode compete, and a specific process routine is mentioned hereinbelow (FIG. 28).

Figure 29:
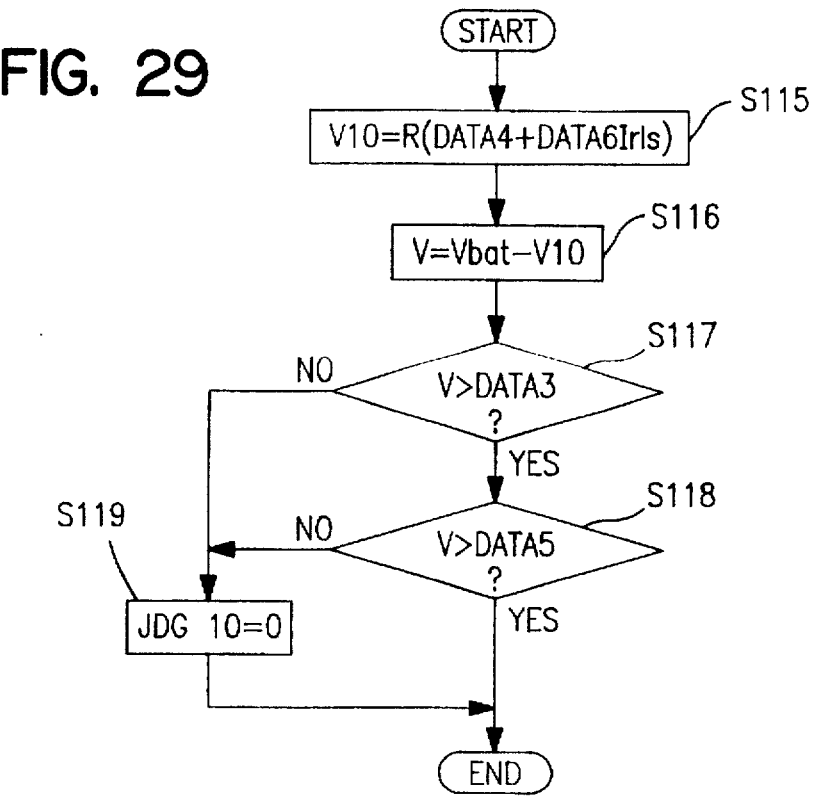
FIG. 29 is a flow chart of a MODE 10 decision according to a preferred embodiment of the present invention.

Next, if the current mode is the motion compensation mode in step S63, the decision result of step S63 becomes affirmative (YES), the MODE 10 decision is performed in step S67, and this routine ends. That is, the decision of MODE 10, as illustrated in FIG. 19, is performed in the case in which the driving requirements of the three modes, release, AF and motion compensation compete, and a specific process routine is mentioned hereinbelow (FIG. 29).

Next, the decision process sequence of each decision mode (MODE 1–MODE 10) will be described.

FIG. 20 is a flow chart of the MODE 1 decision. In FIG. 20, step S70, the voltage drop V1 when the current of "DATA 2" flows is calculated by multiplying "DATA 2", which is the acquired limiting current value of zoom motor 21 by the power supply equivalent output resistance R.

In step S71, a voltage V is obtained by subtracting the voltage drop V1 from the power supply voltage Vbat. In step S72, the relationship of this voltage V and the "DATA 1" (which is the lower limit voltage value of the zoom motor 21 acquired from the photographic lens) is compared to determine which is higher or lower.

If the voltage V is greater than "DATA 1", driving is possible, the decision result of step S72 becomes affirmative (YES), the decision flag JDG 1 remains at JDG1=1, and this routine ends.

On the other hand, if the voltage V is less than "DATA 1", the desired driving cannot be expected, the decision result of step S72 becomes negative (NO), in step S73 the decision flag JDG 1 is set to JDG1=0, and this routine ends.

FIG. 21 is a flow chart of the MODE 2 decision. In FIG. 21, step S76, the voltage drop V2 when the current of "DATA 4" flows is calculated by multiplying "DATA 4", which is the acquired limiting current value of AF motor 22, by the power supply equivalent output resistance R.

In step S77, a voltage V is obtained by subtracting the voltage drop V2 from the power supply voltage Vbat. In step S78, the relationship of this voltage V and the "DATA 3" (which is the lower limit voltage value of AF motor 23 acquired from the photographic lens) is compared to determine which is larger or smaller.

If the voltage V is greater than "DATA 3", driving is possible, the decision result of step S78 becomes affirmative (YES), the decision flag JDG 2 remains at JDG 2=1, and this routine ends.

On the other hand, if the voltage V is less than "DATA 3", the desired driving cannot be expected, the decision result of step S78 becomes negative (NO), in step S79 the decision flag JDG 2 is set to JDG 2=0, and this routine ends.

FIG. 22 is a flow chart of the MODE 3 decision. In FIG. 22, step S80, the voltage drop V3 when the current of "DATA 6" flows is calculated by multiplying "DATA 6", which is the acquired limiting current value of AF motor 22, by the power supply equivalent output resistance R.

In step S81, a voltage V is obtained by subtracting the voltage drop V3 from the power supply voltage Vbat. In step S82, the relationship of voltage V and the "DATA 5" (which is the lower limit voltage value of motion compensation motor 22 acquired from the photographic lens) is compared to determine which is larger or smaller.

If the voltage V is greater than "DATA 5", driving is possible, the decision result of step S78 becomes affirmative (YES), the decision flag JDG 2 remains at JDG 2=1, and this routine ends.

On the other hand, if the voltage V is less than "DATA 5", the desired driving cannot be expected, the decision result of step S82 becomes negative (NO), in step S83 the decision flag JDG 3 is set to JDG 3=0, and this routine ends.

Figure 23:
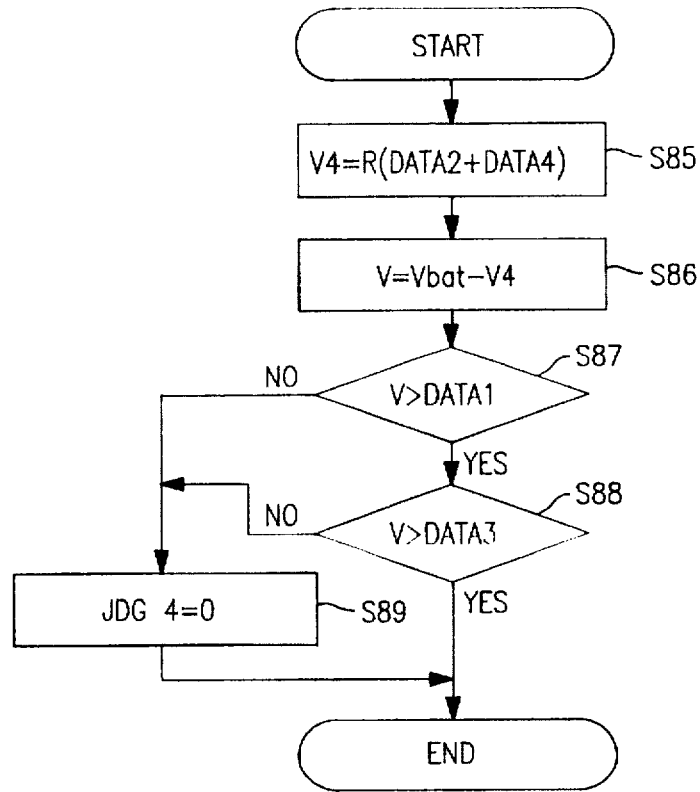
FIG. 23 is a flow chart of a MODE 4 decision according to a preferred embodiment of the present invention.

FIG. 23 is a flow chart of the MODE 4 decision. In FIG. 23, step S85, multiplying (DATA 2+DATA 4), which is the sum of the acquired limiting current values of zoom motor 21 and AF motor 23, by the power supply equivalent output resistance R, the voltage drop V4 when the current of (DATA 2+DATA 4) flows is calculated.

In step S86, a voltage V is obtained by subtracting the voltage drop V4 from the power supply voltage Vbat. In step S87, the relationship of voltage V and the "DATA 1" (which is the lower limit voltage value of the zoom motor 21 acquired from the photographic lens) is compared to determine which is larger or smaller.

If the voltage V is greater than "DATA 1", drive is possible, the decision result of step S87 becomes affirmative (YES), and proceeding to step S88, the relationship of voltage V and "DATA 3" (which is the lower limiting voltage value acquired from the AF motor 23 of the photographic lens) is compared to determine which is larger or smaller.

If the voltage V is greater than "DATA 3", drive is possible, the decision result in step S88 becomes affirmative (YES), the MODE 4 decision flag JDG 4 remains at JDG 4=1, and this routine ends. On the other hand, when the voltage V is less than "DATA 1" in step S87, the desired driving cannot be expected, and the decision result of step S87 becomes negative (NO). Moreover, in step S88, when the voltage V becomes less than "DATA 3", the decision result of step S88 becomes negative (NO).

In these cases, when it is decided that the desired operation of simultaneously driving both zoom motor 21 and AF motor 23 is not possible, the decision flag JDG 4 is set to JDG 4=0 in step S89, and this routine ends.

FIG. 24 is a flow chart of the MODE 5 decision. In FIG. 24, step S90, the voltage drop V5 when the current of (DATA 2+DATA 6) flows is calculated by multiplying (DATA 2+DATA 6), which is the sum of the acquired limiting current values of the zoom motor 21 and motion compensation motor 22 by the power supply equivalent output resistance R.

In step S91, a voltage V is obtained by subtracting the voltage drop V5 from the power supply voltage Vbat. In step S92, this voltage V and the "DATA 1" (which is the lower limit voltage value of zoom motor 21 acquired from the photographic lens) is compared to determine which is larger or smaller.

If the voltage V is greater than "DATA 1", drive is possible, the decision result of step S92 becomes affirmative (YES), and proceeding to step S93, the relationship of this voltage V and "DATA 5", which is the lower limiting voltage value acquired from motion compensation motor 22 of the photographic lens, is compared to determine which is larger or smaller.

If the voltage V is greater than "DATA 5", it is determined that driving is possible, the decision result in step S93 becomes affirmative, the MODE 5 decision flag JDG 5 remains at JDG 5=1, and this routine ends. On the other hand, when the voltage V is less than "DATA 1" in step S92, the desired driving cannot be expected, the decision result of step S92 becomes negative (NO); moreover, in step S93, when the voltage V becomes less than "DATA 5", the decision result of step S93 becomes negative (NO).

In these cases, when it is decided that the desired operation of simultaneously driving both the zoom motor 21 and motion compensation motor 22 is not possible, in step S94 the decision flag JDG 5 is set to JDG 5=0, and this routine ends.

FIG. 25 is a flow chart of the MODE 6 decision. In FIG. 25, in step S95, multiplying (DATA 4+DATA 6), which is the sum of the acquired limiting current values of the AF motor 23 and motion compensation motor 22, by the power supply equivalent output resistance R, the voltage drop V6 when the current of (DATA 4+DATA 6) flows is calculated.

In step S96, a voltage V is obtained by subtracting the voltage drop V6 from the power supply voltage Vbat. In step S97, this voltage V and the "DATA 3" (which is the lower limit voltage value of zoom motor 21 acquired from the photographic lens) are compared to determine which is larger or smaller.

If the voltage V is greater than "DATA 3", drive is possible, the decision result of step S97 becomes affirmative (YES) and, proceeding to step S98, the relationship of this voltage V and "DATA 5", which is the lower limiting voltage value acquired from motion compensation motor 22 of the photographic lens, is compared to determine which is larger or smaller.

If the voltage V is greater than "DATA 5", drive is possible, the decision in step S98 becomes affirmative, the MODE 6 decision flag JDG 6 remains at JDG 6=1, and this routine ends. On the other hand, when the voltage V is less than "DATA 3" in step S97, the desired driving cannot be expected, and the decision result of step S97 becomes negative (NO). Moreover, in step S98, when the voltage V becomes less than "DATA 5", the decision result of step S98 becomes negative (NO).

In these cases, when it is decided that the desired operation of simultaneously driving both AF motor 23 and motion compensation motor 22 is not possible, in step S99 the decision flag JDG 6 is set to JDG 6=0, and this routine ends.

Next, FIG. 26 is a flow chart of the MODE 7 decision. In FIG. 26, step S101, the voltage drop V7 when the current of (DATA 2+DATA 4+DATA 6) flows is calculated by multiplying (DATA 2+DATA 4+DATA 6), which is the sum of the acquired limiting current values of zoom motor 21, AF motor 23 and motion compensation motor 22, by the power supply equivalent output resistance R.

In step S102, a voltage V is obtained by subtracting the voltage drop V7 from the power supply voltage Vbat. In step S103 this voltage V and the "DATA 1" (which is the lower limit voltage value of the zoom motor 21 acquired from the photographic lens) are compared to determine which is larger or smaller.

If the voltage V is greater than "DATA 1", drive is possible, the decision result of step S103 becomes affirmative (YES) and, proceeding to step S104, the relationship of this voltage V and "DATA 3", which is the lower limiting voltage value acquired from the AF motor 23 of the photographic lens, is compared to determine which is larger or smaller.

If the voltage V is greater than "DATA 3", drive is possible, the decision result in step S104 becomes affirmative and, proceeding to step S105, this voltage V and "DATA 5", which is the lower limiting voltage value acquired from motion compensation motor 22 of the photographic lens, are compared to determine which is larger or smaller.

If the voltage V is greater than "DATA 5", drive is possible, the decision result in step S105 becomes affirmative (YES), the MODE 7 decision flag JDG 7 remains at JDG 7=1, and this routine ends. On the other hand, when the voltage V is less than "DATA 1" in step S103, the decision result of step S103 becomes negative (NO). Moreover, in step S104, when the voltage V becomes less than "DATA 3", the decision result of step S104 becomes negative (NO). In step S105, when the voltage V becomes less than "DATA 5", the decision result of step S105 becomes negative (NO).

In these cases, when it is decided that the desired operation of simultaneously driving both zoom motor 21, AF motor 23, motion compensation motor 22 is not possible, in step S106 the decision flag JDG 7 is set to JDG 7=0, and this routine ends.

Figure 38:
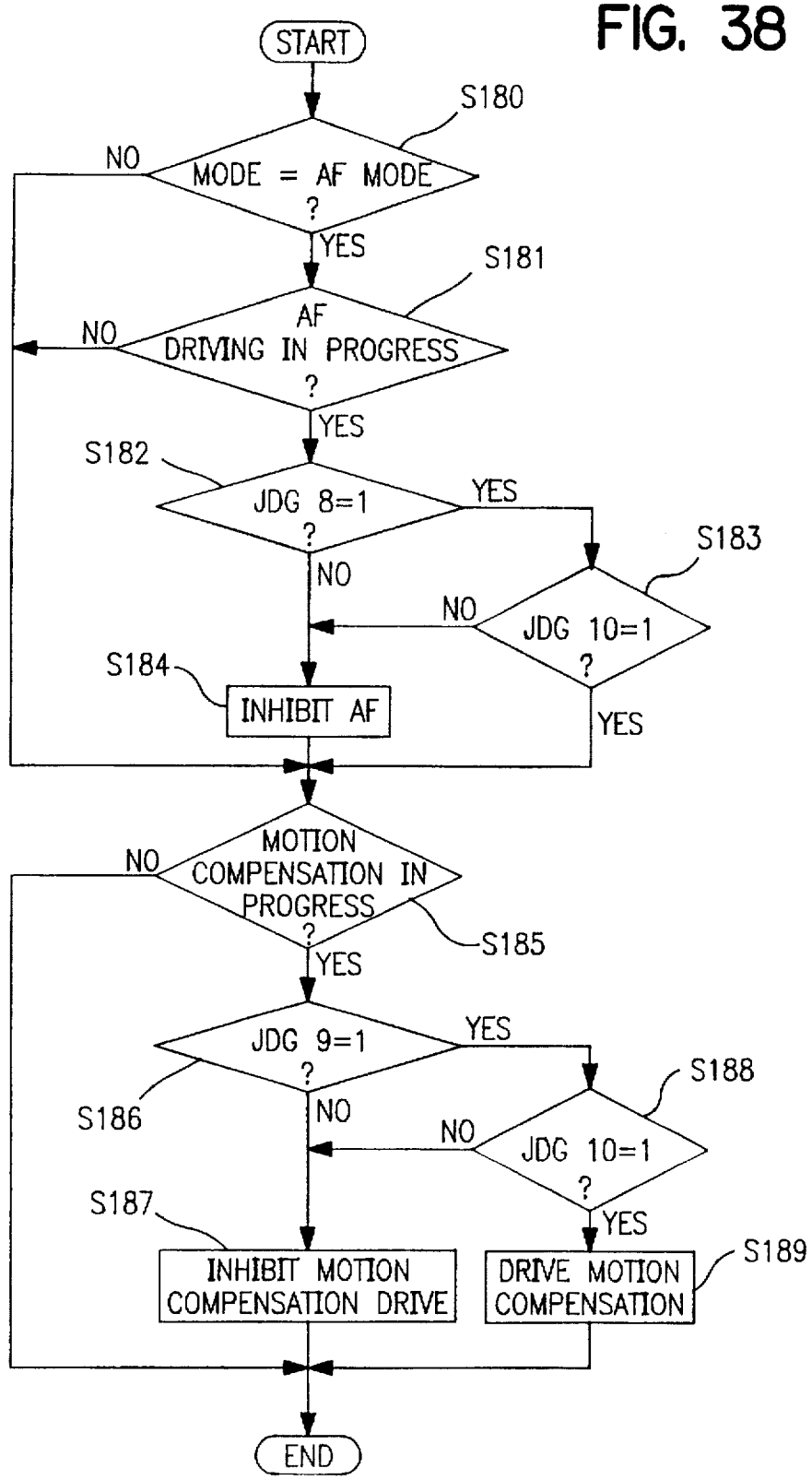
FIG. 38 is a flow chart illustrating a release starting process according to a preferred embodiment of the present invention.

Next, FIG. 27 is a flow chart of the MODE 8 decision. The decision process of this mode 8 is used during the release drive process, as mentioned hereinbelow (FIG. 38).

In FIG. 27, step S107, the voltage drop V8 when the current (DATA 4+Ir1s) flows is calculated by multiplying the sum (DATA 4+Irs) of the lower limit current value "DATA 4" (acquired from the photographic lens, of the AF motor, and the already known current value "Ir1s" necessary for release operation of the camera body) by the power supply equivalent output resistance R.

In step S108, a voltage V is obtained by subtracting the voltage drop V8 from the power supply voltage Vbat. In step S109, this voltage V and the "DATA 3" (which is the lower limit voltage value of the AF motor 23 acquired from the photographic lens) are compared to determine which is larger or smaller.

If the voltage V is greater than "DATA 3", drive is possible, the decision result of step S109 becomes affirmative (YES), the decision flag JDG 8 remains at JDG 8=1, and this routine ends. On the other hand, if the voltage V is less than "DATA 3", it is decided that the desired operation cannot be expected by simultaneous driving of the AF motor 23 and the release sequence, the decision result in step S109 becomes negative (NO), in step S110 the decision flag JDG 8 is set to JDG 8=0, and this routine ends.

Next, FIG. 28 is a flow chart of the MODE 9 decision. The decision process of this mode 9 uses a release drive process time, as mentioned hereinbelow (FIG. 38).

In FIG. 28, step S111, the voltage drop V9 when the current (DATA 6+Ir1s) flows is calculated by multiplying the sum (DATA 6+Ir1s) of the lower limit current value "DATA 6", acquired from the photographic lens of motion compensation motor 22 and the already known current value "Ir1s" necessary for release operation of the camera body, by the power supply equivalent output resistance R.

In step S112, a voltage V is obtained by subtracting the voltage drop V9 from the power supply voltage Vbat. In step S113, this voltage V and the "DATA 5" (which is the lower limit voltage value of motion compensation motor 22 acquired from the photographic lens) are compared to determine which is larger or smaller.

If the voltage V is greater than "DATA 5", drive is possible, the decision result of step S113 becomes affirmative (YES), the decision flag JDG 9 remains at JDG 9=1, and this routine ends. On the other hand, if the voltage V is less than "DATA 5", it is decided that the desired operation cannot be expected by simultaneous driving of motion compensation motor 22 and the release sequence, the decision result in step S113 becomes negative (NO), in step S114 the decision flag JDG 9 is set to JDG 9=0, and this routine ends.

Next, FIG. 29 is a flow chart of the MODE 10 decision. The decision process of this mode 10 uses a release drive process time, as mentioned hereinbelow (FIG. 38).

In FIG. 29, step S115, the voltage drop V10 when the current (DATA 4+DATA 6+Ir1s) flows is calculated by multiplying the sum (DATA 4+DATA 6+Ir1s) of the lower limit current value "DATA 4" acquired from the photographic lens of the AF motor 22, the lower limit current value "DATA 6" acquired from the photographic lens of motion compensation motor 22, and the already known current value "Ir1s" necessary for release operation of the camera body, by the power supply equivalent output resistance R.

In step S116, a voltage V is obtained by subtracting the voltage drop V10 from the power supply voltage Vbat. In step S117, this voltage V and the "DATA 3" (which is the lower limit voltage value of the AF motor 23, acquired from the photographic lens) are compared to determine which is larger or smaller.

If the voltage V is greater than "DATA 3", drive is possible, the decision result of step S117 becomes affirmative (YES), and in the next step, S118, this voltage V and "DATA 5", which is the lower limiting voltage value acquired from motion compensation motor 22 of the photographic lens, is furthermore compared are compared to determine which is larger or smaller.

Then if the voltage V is greater than "DATA 3", the decision result in step S118 becomes affirmative, and it is determined that simultaneous driving of the AF motor 23, the motion compensation motor 22, and the release sequence, is possible. The MODE 10 decision flag JDG 10 remains at JDG 10=1 and this routine ends.

On the other hand, if the voltage V is less than "DATA 3", the decision result in step S117 becomes negative (NO). Moreover, if the voltage V is less than "DATA 5", the decision result in step S118 becomes negative (NO).

In these cases, it is decided that AF motor 23, motion compensation motor 22 and the release sequence cannot all three be expected to operate, and in step S119 the decision flag JDG 10 is set to JDG 10=0, and this routine ends.

Figure 30:
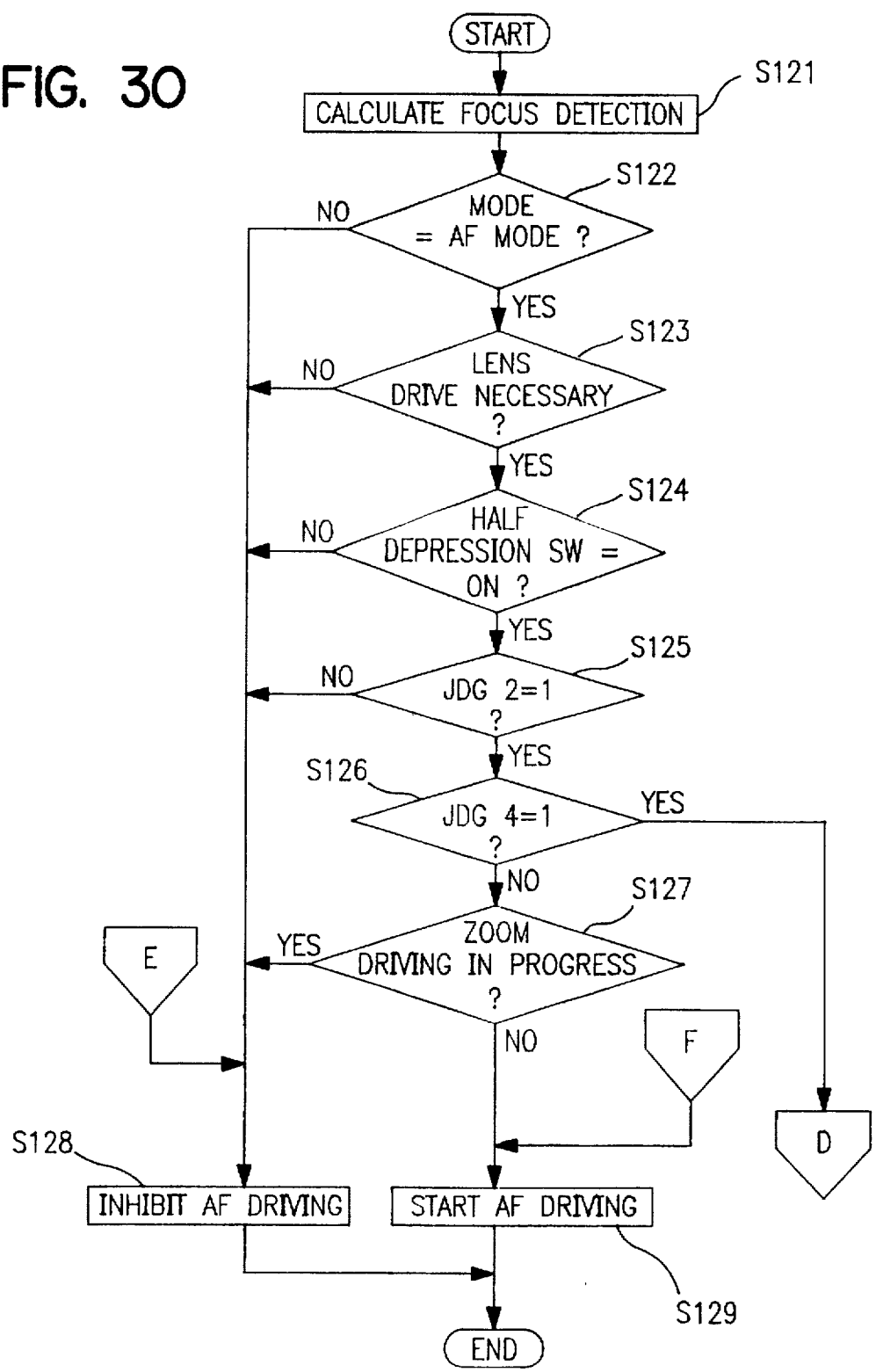
FIG. 30 is a flow chart illustrating an AF process according to a preferred embodiment of the present invention.
Figure 31:
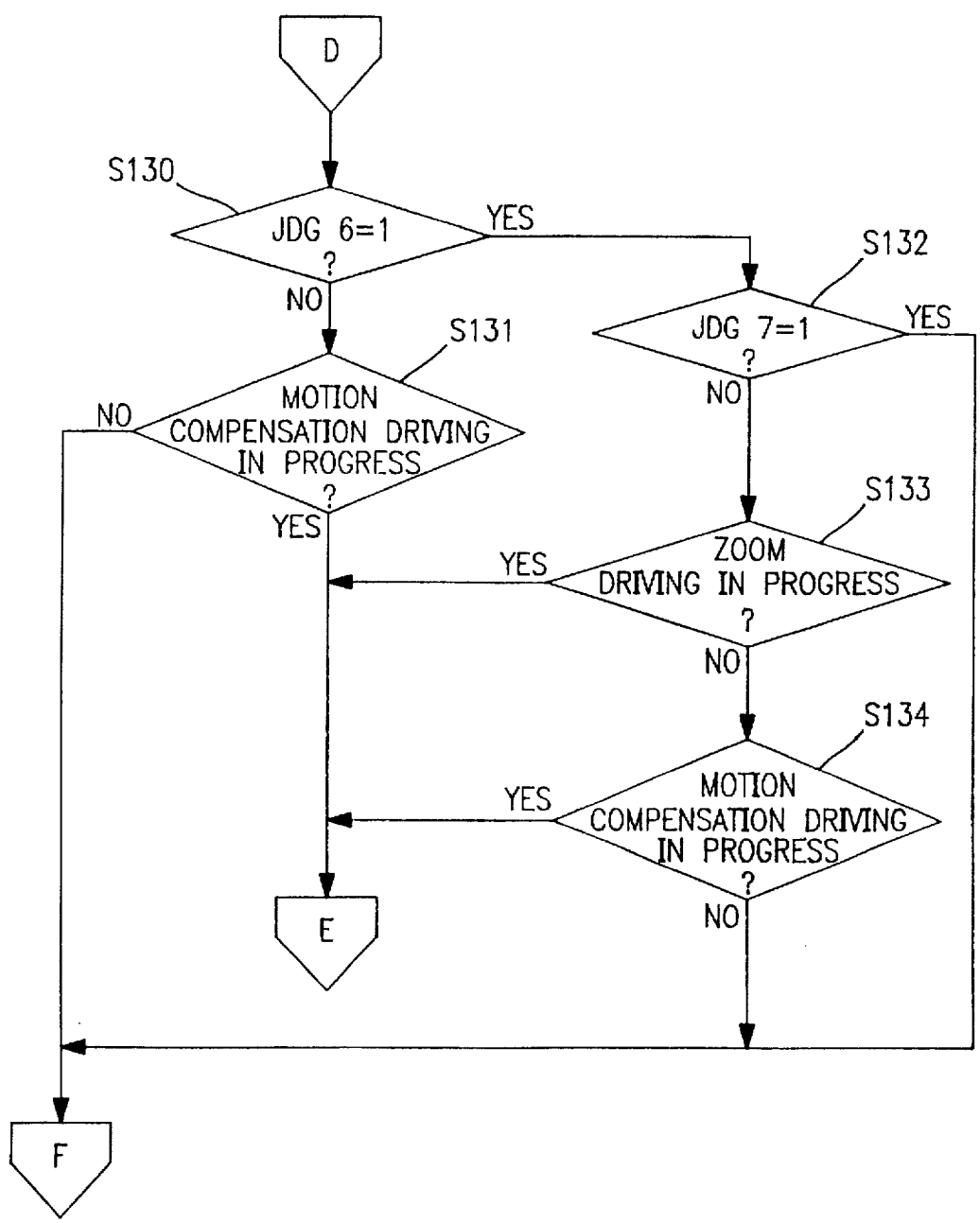
FIG. 31 is a continuation of the flow chart of FIG. 30.

FIGS. 30 and 31 are a flow chart of the AF process of step S8 performed in succession to step S7 in FIG. 7. In FIG. 30, step S121, a focus detection calculation is performed, based on the CCD data obtained in the CCD process (step S7). In step S122 it is determined whether the current mode is the AF mode.

If the current mode is not the AF mode in Step S122, the decision result of step S122 becomes negative (NO), and the AF drive is inhibited in step S128.

Namely, if driving the AF motor 23, the drive of the AF motor 23 is inhibited; if not driving the AF motor, this unchanged AF motor is not started, and this routine ends. This AF drive inhibition is accomplished by transmitting the aforementioned command 33H to the photographic lens.

On the other hand, if it is the AF mode in step S122, the decision result of step S122 becomes affirmative (YES) and, proceeding to step S123, it is decided whether it is necessary to drive the AF motor of the photographic lens.

For example, if focused, it is not necessary to drive the AF motor 23. Moreover, when the subject is moving, even though focused, it is necessary to cause movement of the imaging position of the lens according to the image plane movement of the subject, and in this case it is necessary to drive the AF motor.

If the decision result of step S123 is negative (NO), advancing to step S128, driving AF motor 23 is not possible and this routine ends.

On the other hand, if the decision result of step S123 is affirmative (YES), proceeding to step S124, it is determined whether the half depression switch SW34 is ON. This is because the AF drive process operates when the half depression switch 34 is ON.

If the decision result of step S124 is negative (NO), driving of AF motor 23 is not possible, and proceeding to step S128, the present routine ends as the AF drive inhibition process. On the other hand, if the decision result of step S124 is affirmative (YES), proceeding to step S125, it is determined whether JDG 2=1.

If the decision result of step S125 is negative (NO), driving the AF motor 23 is not possible, and proceeding to step S128, the present routine ends as the AF drive inhibition process. On the other hand, if the decision result of step S125 is affirmative (YES), proceeding to step S126, it is determined whether JDG 4=1.

If the decision result of step S126 is negative (NO), proceeding to step S127, it is determined whether zoom driving is in progress. This is because it cannot be driven simultaneously with the zoom motor 21.

Accordingly, in the case that the decision result of step S127 is affirmative (YES), the AF motor 23 cannot be driven, and proceeding to step S128, S128, the present routine ends as the AF drive inhibition process.

On the other hand, if the decision result of step S127 is negative, driving of AF motor 23 is possible, and proceeding to step S129, starting driving of AF motor 23, this routine ends.

The driving of this AF motor 23 is achieved by transmission to the photographic lens of the aforementioned command 32H. Moreover, the drive amount and drive speed are instructed by 3-byte data transmitted in succession in the command 32H.

If the decision result of step S126 is affirmative (YES), proceeding to step S130 of FIG. 31, it is determined whether JDG 6=1. If the decision result of step S130 is negative (NO), proceeding to step S131, it is determined whether motion compensation driving is in progress.

When the decision result of step S131 is affirmative (YES), because driving simultaneously with motion compensation motor 22 is impossible, process flows to the earlier step S128, AF driving is inhibited, and the present routine ends. On the other hand, when the decision result of step S131 is negative (NO), process flows to the earlier step S129, AF driving starts and the present routine ends.

Moreover, if the decision result of step S130 is affirmative (YES), proceeding to step S132, it is determined whether JDG 7=1. If the decision result of step S132 is affirmative (YES), because AF driving is possible, the routine proceeds to the earlier step S129. On the other hand, if the decision result of step S132 is negative (NO), proceeding to step S133, it is determined whether driving the zoom motor 21 is in progress.

If the decision result of step S133 is affirmative (YES), because AF driving is impossible, the routine proceeds to the earlier step S128. On the other hand, if the decision result of step S133 is negative (NO), proceeding to step 134, it is determined whether driving motion compensation motor 22 is in progress.

When the decision result of step S134 is affirmative (YES), because driving simultaneously with the zoom motor 22 is not possible, the routine proceeds to the earlier step S128, inhibiting AF driving, and this routine ends. On the other hand, when the decision result of step S134 is negative (NO), proceeding to the earlier step S129 and starting the AF drive, the present routine ends.

Figure 32:
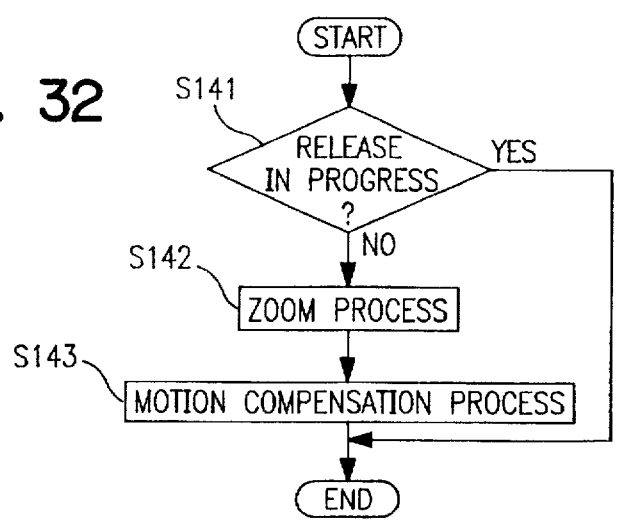
FIG. 32 is a flow chart illustrating a zoom process and a motion compensation process according to a preferred embodiment of the present invention.

Next, FIG. 32 is a flow chart of starting the zoom process and the motion compensation process. Namely, the process of driving the AF motor 23 is started by the main flow of the camera body MCU 30, but the drive process of the zoom motor 21 and motion compensation motor 22 is staffed by the interval timer interruption routine shown in this FIG. 32.

In FIG. 32, in step S114, it is determined whether release is in progress. In step S114, if release is in progress, the decision result becomes affirmative (YES), and the present routine ends without performing a starting process.

On the other hand, when a release is not in progress, the decision result becomes negative (NO), and the zoom process of step S142 (FIGS. 33 and 34) and the motion compensation process of step S143 (FIGS. 35, 36) are performed, and the present routine ends.

Figure 33:
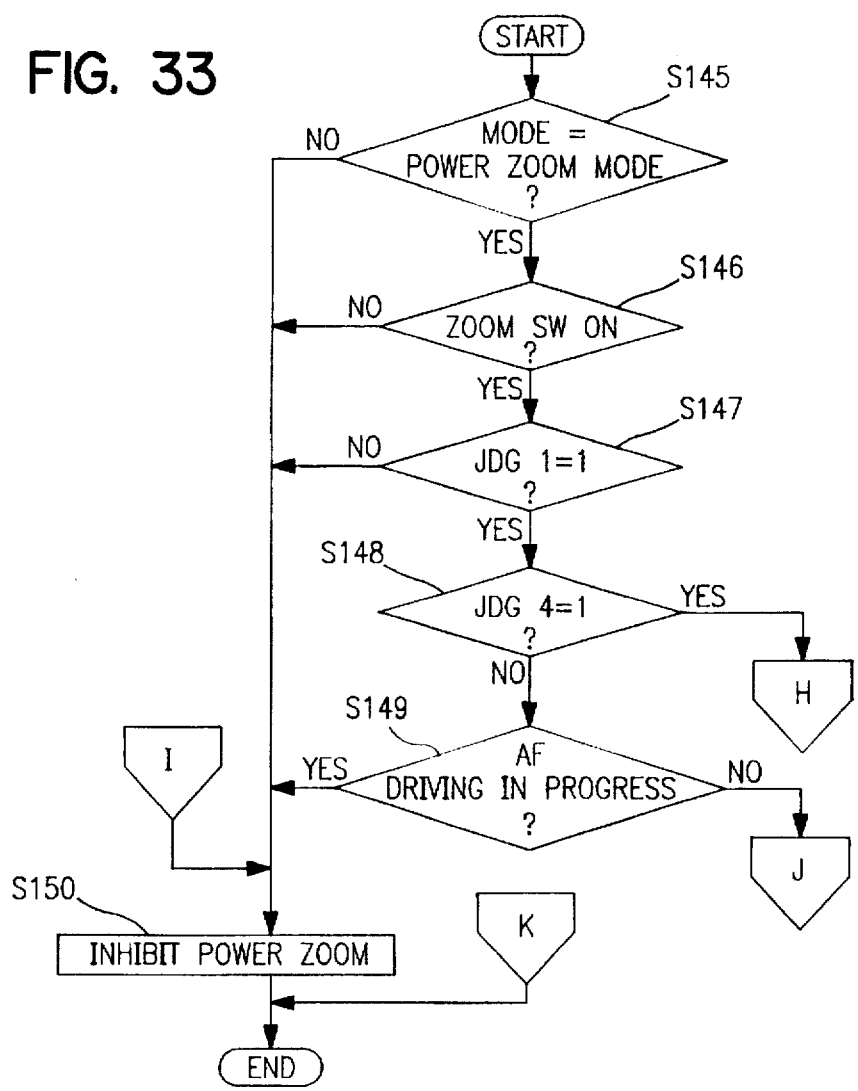
FIG. 33 is a flow chart illustrating a zoom process according to a preferred embodiment of the present invention.
Figure 34:
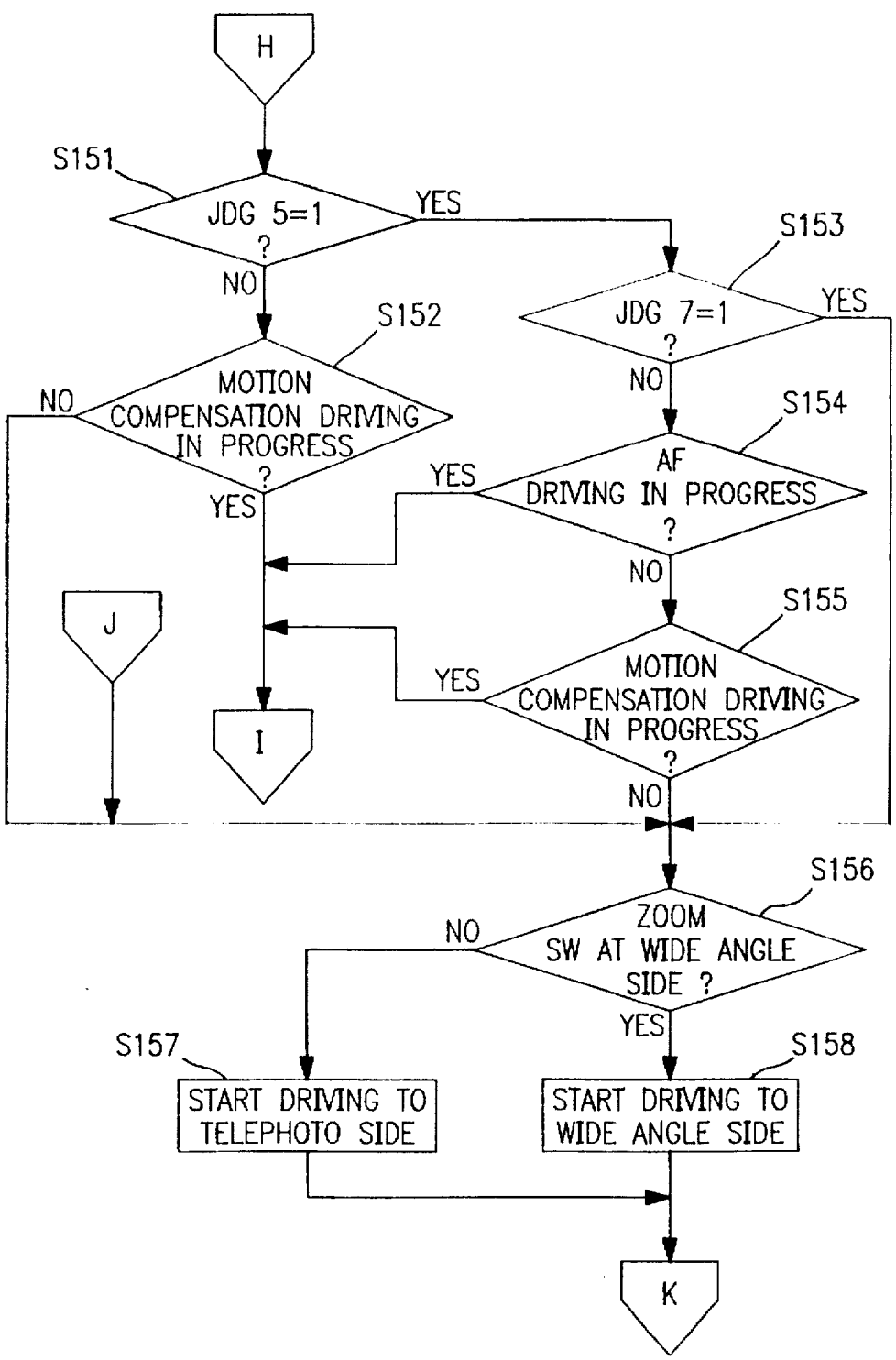
FIG. 34 is a continuation of the flow chart of FIG. 33.

FIGS. 33 and 34 are flow charts of the zoom process of step S142. In FIG. 33, in step S145, it is determined whether it is the power zoom mode. When it is not the power zoom mode, the decision result of step S145 becomes negative (NO), and proceeding to step S150, issuing the command 31H by communication to the photographic lens, power zoom is inhibited, and the present routine ends.

On the other hand, in step S145, if it is power zoom, the decision result becomes affirmative (YES), and proceeding to step S146, it is determined which of the telephoto side T or the wide angle side W of the zoom SW32 is ON.

In step S146, when neither switch is ON, the decision result becomes negative (NO), and proceeding to step S150, power zoom is inhibited and this routine ends. On the other hand, when either is ON, the decision result becomes affirmative (YES) and, proceeding to step S147, it is determined whether JDG 1=1.

In step S147, when JDG 1≠1, the decision result becomes negative (NO), and determining that driving is not possible, even when independent with respect to the zoom operation, proceeding to step S150, power zoom is inhibited and the present routine ends.

On the other hand, when JDG 1=1, the decision result becomes affirmative (YES), and proceeding to step S148 it is determined whether JDG 4=1.

In step S148, when JDG 4=0, the decision result becomes negative (NO), and proceeding to step S149, it is determined whether AF driving is in progress. Moreover, when JDG 4=1, the decision result becomes affirmative (YES), and the routine proceeds to step S151 of FIG. 34.

In step S149, if AF driving is in progress, the decision result becomes affirmative (YES), and because simultaneous driving is not possible during AF driving, the present routine ends via step S150 which does no power zoom drive. On the other hand, if there is no AF drive in progress, the decision result becomes negative (NO), and the routine proceeds to step S156 of FIG. 34.

In FIG. 34, in step S156, it is determined whether the wide angle side of the zoom switch SW34 is ON. When the decision result of step S156 is negative (NO), proceeding to step S157, the zoom drive command 30H is transmitted to the photographic lens so as to drive to the telephoto side, and the present routine ends.

On the other hand, when decision result of step S156 is affirmative (YES), proceeding to step S158, the zoom drive command 30H is transmitted to the photographic lens so as to drive to the wide angle side, and the present routine ends. Moreover, the zooming direction is instructed by continuous transmission data in the drive command 30H.

Next, in step S151 of FIG. 34, it is determined whether JDG 5=1. When JDG 5=0, the decision result of step S151 becomes negative (NO), and the routine proceeds to step S152; on the other hand, when JDG 5=1, the decision result of step S151 becomes affirmative (YES), and the routine proceeds to step S153.

In step S152, it is determined whether motion compensation driving is in progress. In the case that motion compensation driving is in progress, the decision result of step S152 becomes affirmative (YES), and the routine proceeds to the earlier step S150. On the other hand, when the motion compensation driving is not in progress, the decision result of step S152 becomes negative (NO), and the routine proceeds to the aforementioned step S156.

In step S153, it is determined whether JDG 7=1. When JDG 7=1, the decision result of step S153 becomes affirmative (YES), and the routine proceeds to the aforementioned S156. On the other hand, when JDG 7≠1, the decision result of step S153 becomes negative (NO), and the routine proceeds to step S154.

In step S154, it is determined whether AF driving is in progress. When AF driving is in progress, the decision result of step S154 becomes affirmative (YES), and the routine proceeds to the earlier step S150. On the other hand, when AF driving is not in progress, the decision result of step S154 becomes negative (NO), and the routine proceeds to S155.

In step S155, it is determined whether motion compensation driving is in progress. When motion compensation driving is in progress, the decision result of step S155 becomes affirmative (YES), and the routine proceeds to the earlier step S150. On the other hand, when the motion compensation driving is not in progress, the decision result of step S155 becomes negative (NO), and the routine proceeds to step S156.

Figure 35:
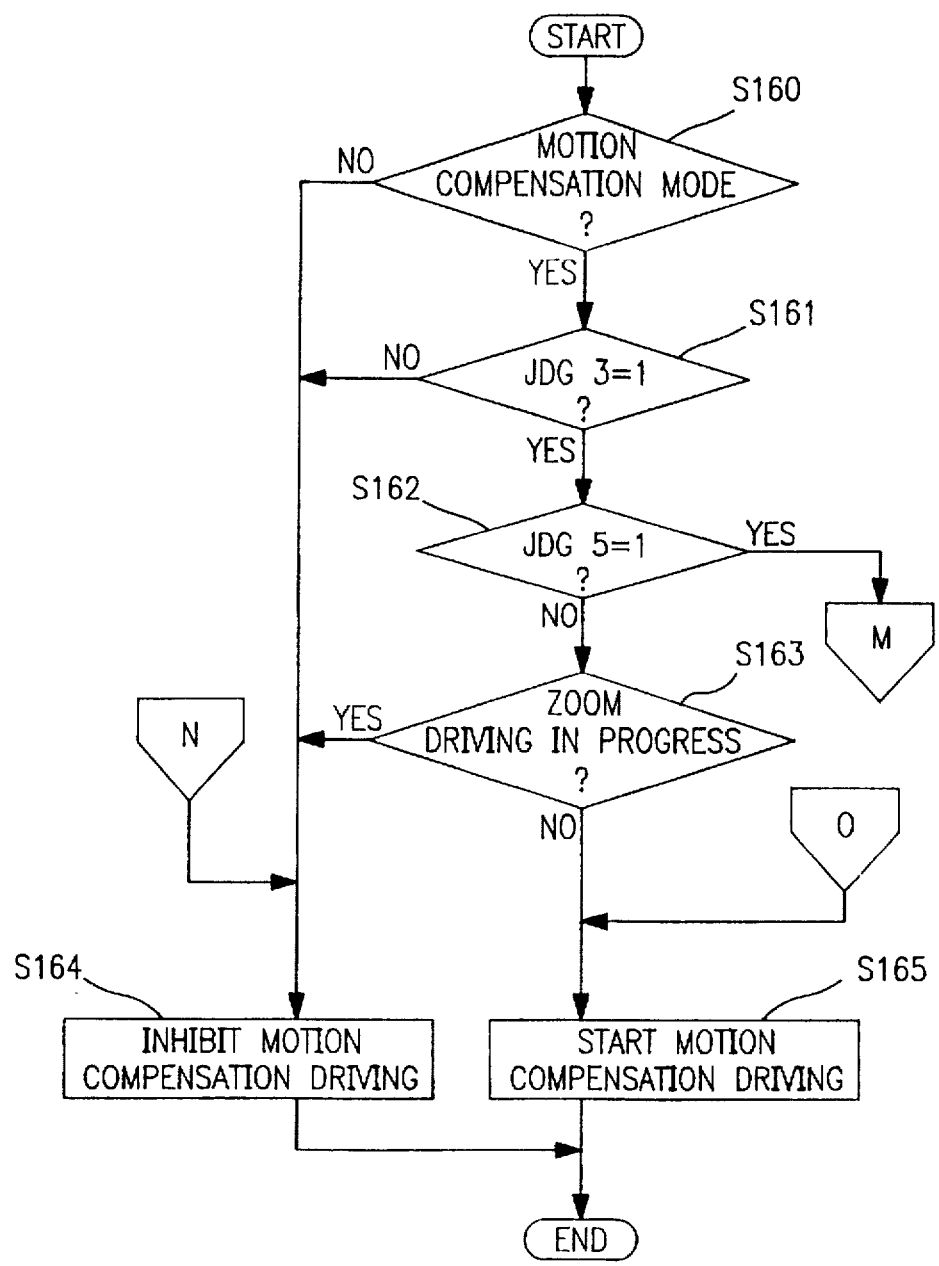
FIG. 35 is a flow chart illustrating a motion compensation process according to a preferred embodiment of the present invention.
Figure 36:
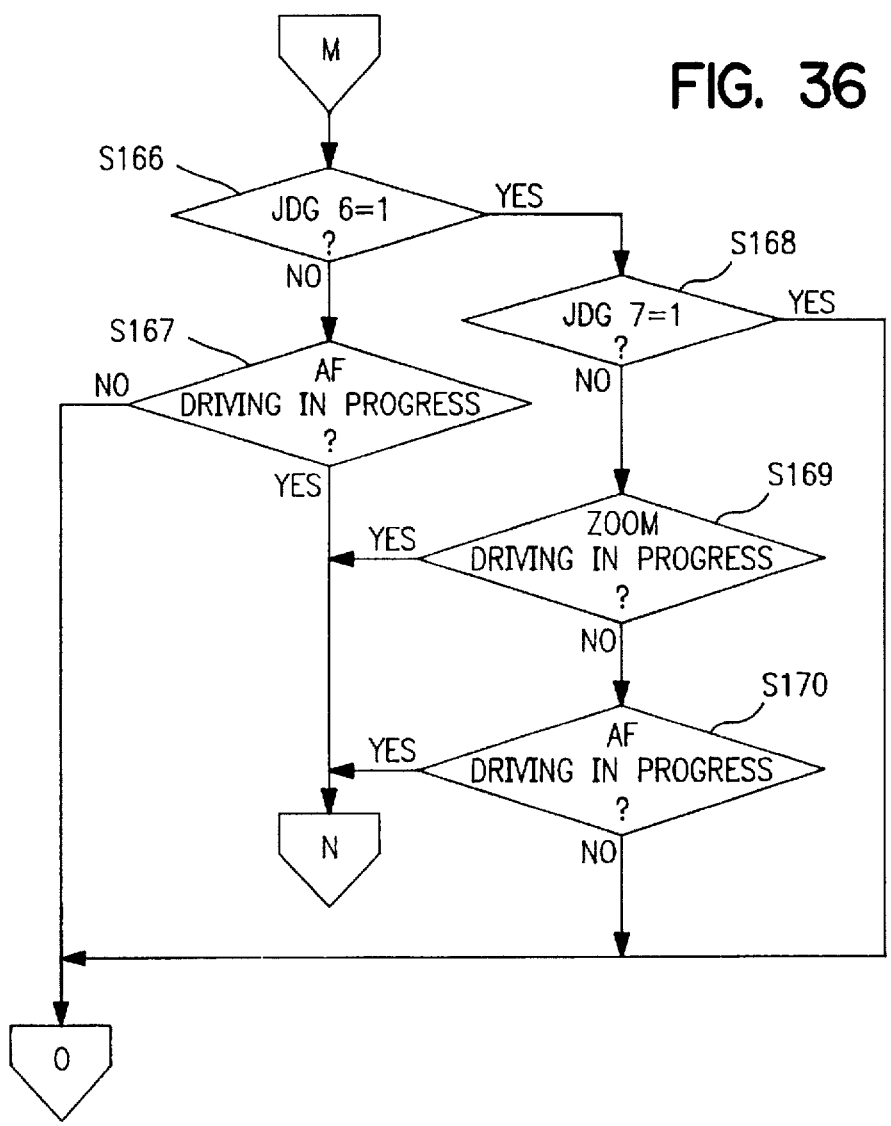
FIG. 36 is continuation of the flow chart of FIG. 35.

Next, FIGS. 35 and 36 are a flow chart of the motion compensation process of step S143 of FIG. 32. In FIG. 35, in step S160, it is determined whether the motion compensation SW39 is turned ON, and the motion compensation mode has been set.

In step S160, when the mode is not the motion compensation mode, the decision result becomes negative (NO), and proceeding to S164, motion compensation is inhibited by issuing the command 35H to the photographic lens, and the present routine ends. On the other hand, if it is the motion compensation mode, the decision result of step S160 becomes affirmative (YES), and the routine proceeds to step S161.

In step 161, it is determined whether JDG 3=1. In step S161, when JDG 3≠1, the decision result becomes negative (NO), and determining that driving is not possible, even when independent with respect to motion compensation driving, proceeding to step S164, the present routine ends. On the other hand, when JDG 3=1, the decision result becomes affirmative (YES), and the routine proceeds to step S162.

In step S162, it is determined whether JDG 5=1. In step S162, when JDG 5=0, the decision result becomes negative (NO), and proceeding to step S163, it is determined whether zoom driving is in progress. Moreover, when JDG 5=1, the decision result becomes affirmative (YES), and the routine proceeds to step S166 of FIG. 36.

In step S163, if zoom driving is in progress the decision result becomes affirmative (YES), and because driving is not possible at the same time as when zoom driving is in progress, in step S164 motion compensation driving is inhibited and the present routine ends. On the other hand, if zoom driving is not in progress, the decision result becomes negative (NO), and the routine proceeds to step S165.

In step S165, determining that motion compensation driving is possible, motion compensation driving is started by transmitting command 34H to the photographic lens.

Next, in step S166 of FIG. 36, it is determined whether JDG 6=1. When JDG 6=0, the decision result of step S166 becomes negative (NO), and the routine proceeds to S167; on the other hand, when JDG 6=1, the decision result of step S166 becomes affirmative (YES), and the routine proceeds to step S168.

In step S167, it is determined whether AF driving is in progress. In the case that AF driving is in progress, the decision result of step S167 becomes affirmative (YES), and the routine proceeds to the earlier step S164. On the other hand, when AF driving is not in progress, the decision result of step S167 becomes negative (NO), and the routine proceeds to step S169.

In step S169, it is determined whether zoom driving is in progress. When zoom driving is in progress, the decision result of step S169 becomes affirmative (YES), and the routine proceeds to step S164. On the other hand, when zoom driving is not in progress, the decision result of step S169 becomes negative (NO), and the routine proceeds to step S170.

In step S170, it is determined whether AF driving is in progress. When AF driving is in progress, the decision result of step S170 becomes affirmative (YES), and the routine proceeds to the earlier step S164. On the other hand, when AF driving is not in progress, the decision result of step S170 becomes negative (NO), and the routine proceeds to step S165.

In the above manner, in cases in which the drive demands of the plural actuators of the photographic lens were in competition, taking into account the power supply characteristics of each actuator, adjustment is made so that these do not drive simultaneously.

Figure 37:
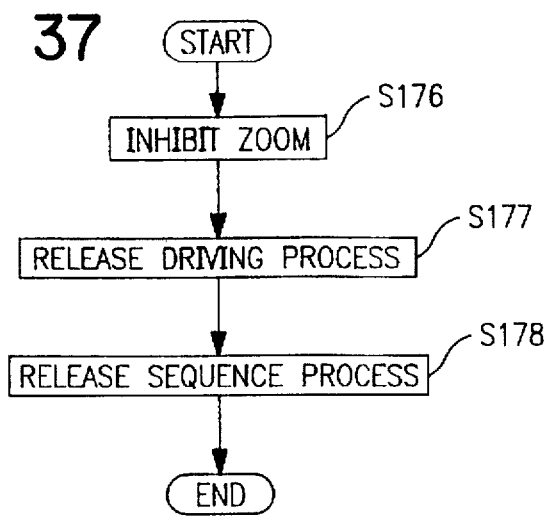
FIG. 37 is a flow chart illustrating a release interruption according to a preferred embodiment of the present invention.

Next, FIG. 37 is a flow chart of the release interruption. When the release SW42 is turned ON, the camera body MCU 30, by way of changing the negative edge impressed on this interruption terminal INT, starts this interruption routine, and effects each process of steps S176–S178, ending this release interruption process routine.

In step S176, driving of the zoom motor 21 is inhibited. In step S177, the release drive process, mentioned later (FIG. 38), is performed. In step S178, by way of driving the sequence motor 31 within the camera body, aperture control, shutter control, film forwarding which is preparation for the next photograph, shutter charge and the like series of release sequence processes is performed.

FIG. 38 is a flow chart of the release drive process of step S177. This process determines the drive state for the AF and motion compensation before the release sequence commences.

For example, speaking of the AF, determines whether driving is possible overlapping the release action if it is the case that it is started within the main routine, and according to the result of this decision, performs an inhibition, and the like, of this drive.

In FIG. 38, in step S180, it is determined whether the mode is the AF mode. When it is not the AF mode, the decision result of step S180 becomes negative (NO), and the routine proceeds to step S185. On the other hand, when it is the AF mode, the decision result of step S180 becomes affirmative (YES), and the routine proceeds to step S181.

In step S181, it is decided whether AF driving is in progress. When AF driving is not in progress, the decision result of step S181 becomes negative (N), and the routine proceeds to step S185. On the other hand, when AF driving is in progress, the decision result of step S181 becomes affirmative (YES), and the routine proceeds to step S182.

In step S182, it is determined whether JDG 8=1. Namely, it determines whether an action which overlaps with release is possible. When JDG 8=1, the decision result of step S182 becomes affirmative (YES), and the routine proceeds to step S183. On the other hand, when JDG 8=0, the decision result of step S182 becomes negative (NO), and the routine proceeds to step S184.

In step S183, it is determined whether JDG 10=1. Namely, a decision is performed as to whether the three, motion compensation, AF, and release, can be driven simultaneously. When JDG 10=1, the decision result of step S183 becomes affirmative (YES), and the routine proceeds to step S185. On the other hand, when JDG 10=0, the decision result of step S183 becomes negative (NO), and the routine proceeds to step S184.

In step S184, AF is inhibited. In step S185, it is determined whether the mode is the motion compensation mode. In the case that the decision result of step S185 is negative, the present routine ends unchanged. On the other hand, in the case that the decision result of step S185 is affirmative (YES), the routine proceeds to step S186.

In step S186, it is determined whether JDG 9=1. When JDG 9=0, the decision result becomes negative (NO) and, proceeding to step S187, it is considered impossible to perform both release and motion compensation simultaneously; motion compensation drive inhibition is performed by transmitting the 35H motion compensation inhibition command to the photographic lens, and the present routine ends.

On the other hand, when JDG 9=1, the decision result of step S186 becomes affirmative (YES), and the routine proceeds to step S188. In step S188, it is determined whether JDG 10=1. Namely, a determination is performed of whether motion compensation, AF and release can be performed simultaneously. When JDG 10=0, the decision result of step S188 becomes negative (NO) and, proceeding to step S187, motion compensation is similarly inhibited, and this routine ends.

On the other hand, when JDG 10=1, the decision result of step S188 becomes affirmative (YES), and the routine proceeds to step S189; it is considered possible to drive release and motion compensation simultaneously, and motion compensation driving is performed by transmitting the motion compensation drive command 34H to the photographic lens, and the present routine ends.

In the above manner, in cases in which the driving demands for the plural actuators of the photographic lens and camera body are in competition, adjustments are made, taking the power supply characteristics into account, such that these are not driven simultaneously.

Figure 39:
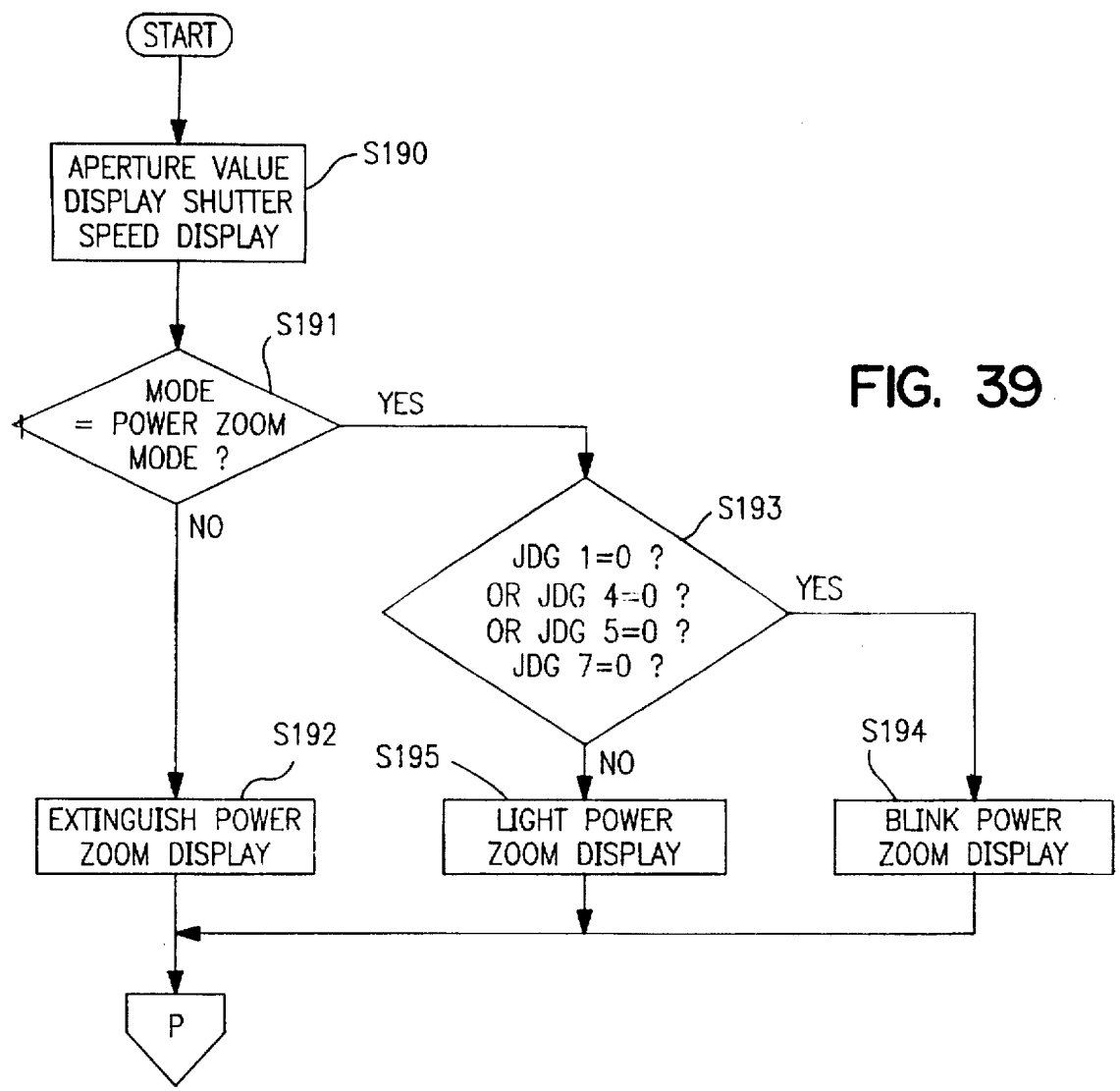
FIG. 39 is a flow chart illustrating a display process according to a preferred embodiment of the present invention.
Figure 40:
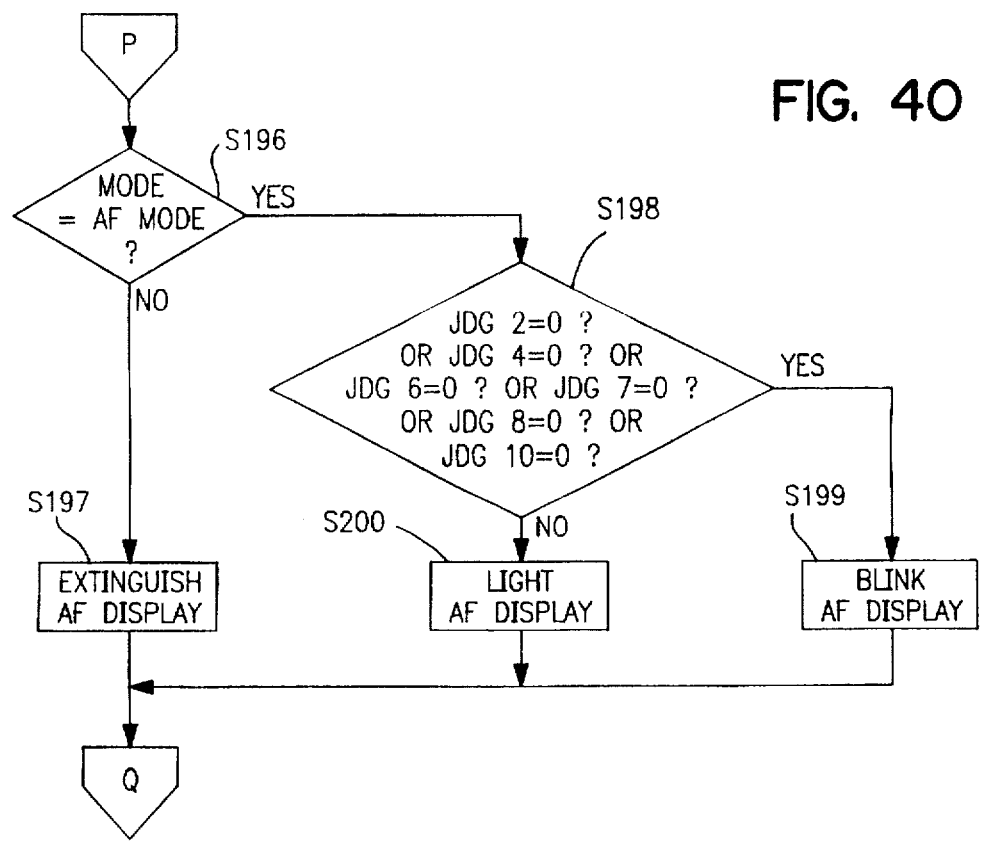
FIG. 40 is a continuation of the flow chart of FIG. 39.
Figure 41:
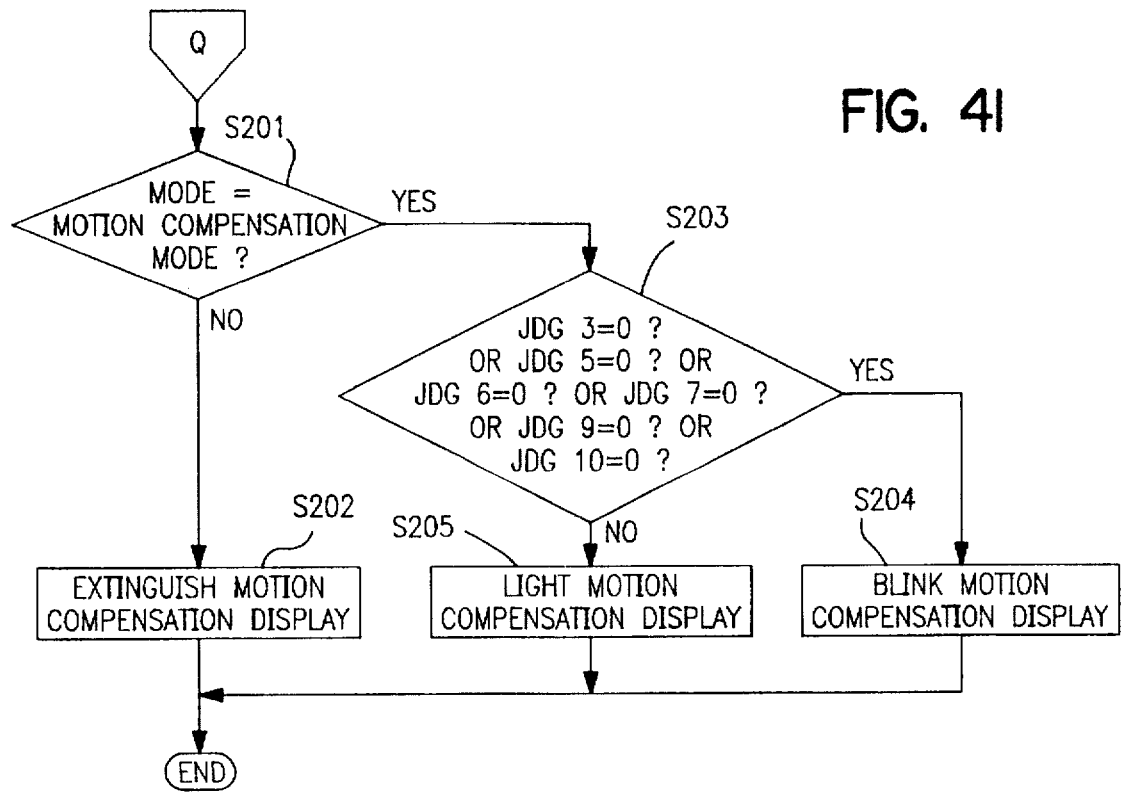
FIG. 41 is a continuation of the flow chart of FIG. 40.

Next, FIGS. 39–41 are a flow chart of the display process of step S10 of FIG. 7. In FIG. 39, in step S190, in step S190, the exposure control aperture value and shutter speed, based on the exposure calculation results which have already been obtained, are displayed.

In step S191, it is determined whether the mode is the power zoom mode. In this step S191, a determination is also performed as to whether the inhibition process of step S150 has been performed. If the decision result of step S191 is negative (NO), the routine proceeds to step S192, the power zoom display lights up, and the routine proceeds to step S196 of FIG. 40. Namely, a display of zoom drive inhibition is effected by lighting up.

On the other hand, if the decision result of step S193 becomes affirmative (YES), and the routine proceeds to step S193. In step S193, it is determined whether any of JDG 1, JDG 4, JDG 5, JDG 7 is "0". If any of them is "0", the decision result of step S193 becomes affirmative (YES) and, proceeding to step S194, the display of power zoom is caused to blink, and the routine proceeds to step S196 of FIG. 40.

The photographer is informed by a warring display by the blinking of the power zoom display that zoom driving cannot be performed simultaneously with other driving.

On the other hand, if all are "1", the decision result of step S193 becomes negative (NO) and, proceeding to step S195, the power zoom display is caused to light up in a normal manner, and the routine proceeds to step S196 of FIG. 40.

In step S196 of FIG. 40, it is determined whether the mode is the AF mode. In this step 196, a decision is performed as to whether the inhibition process of step 128 had been effected.

If it is not the AF mode, the decision result of step S196 becomes negative (NO), and proceeding to step S197, the AF display is extinguished, and the routine proceeds to step S201 of FIG. 41. Namely, the display of inhibition of AF driving is effected by this extinction.

On the other hand, if it is the AF mode, the decision result of step S196 becomes affirmative (YES) and, proceeding to step S198, it is determined whether any of JDG 2, JDG 4, JDG 6, JDG 7, JDG 8, JDG 10 is "0".

In step S198, if any are "0", the decision result becomes affirmative (YES) and, proceeding to step S199, the AF display is caused to blink, and the routine proceeds to step S201. The photographer is informed by a warning display by the blinking of the AF display, to the effect that AF driving cannot be performed while simultaneously driving other actuators.

On the other hand, if all are "1", the decision result of step S198 becomes negative (NO), there is a display to the effect that the AF can drive, and the routine proceeds to step S201 of FIG. 41.

Next, in step S201 of FIG. 41, it is determined whether the mode is the motion compensation mode. In this step S201, a determination is performed as to whether the inhibition processes of step 164 and step 187 have been effected. If it is not the motion compensation mode, the decision result of step S201 becomes negative (NO) and, proceeding to step S202, the motion compensation display is extinguished, and the present routine ends. Namely, a display of the motion compensation drive inhibition is effected by the extinction.

On the other hand, if it is the motion compensation mode, the decision result of step S201 becomes affirmative (YES) and, proceeding to step S203, it is determined whether any of JDG 3, JDG 5, JDG 6, JDG 7, JDG 9, JDG 10 are "0".

In step S203, if any are "0", the decision result becomes affirmative (YES) and, proceeding to step S204, the motion compensation display blinks, and the present routine ends. The photographer is informed by a warning display by the blinking of the motion compensation display, to the effect that motion compensation driving cannot be performed while simultaneously driving other actuators.

On the other hand, if all are "1", the decision result of step S203 becomes affirmative (YES) and, proceeding to step S205, a display is effected to the effect that motion compensation can drive, and the present routine ends.

Moreover, in this mode of embodiment, the decision as to whether a power supply is furnished to the actuators was effected on the camera body side, but transmitting the characteristics of its internal power supply from the camera body side to the photographic lens side, the decision may be performed on the photographic lens side as to whether a power supply is furnished to the actuators, and the result of this decision may be transmitted to the camera body side.

As described hereinabove, the necessary power supply characteristics of the actuators which the photographic lens possesses can be reported to the camera body side. Further, the decision result of whether the actuators of the photographic lens can be driven can be reported to the camera body side.

Moreover, when drive demands have arisen with respect to the actuators of the mounted photographic lens, individual actuators can each receive suitable action according to the power supply capability of the camera body. Then, the result of this action, the photographer can be informed by a display whether the drive for the actuator to be operated is possible. The content of this display is suitably accurate.

On the other hand, because steps are taken in which there is no simultaneous operation of plural actuators, the design can given an increased efficiency of a battery power supply.

Accordingly, because provision of a power supply can be performed according to the individual power supply characteristics of the actuators which the photographic lens possesses, the design can give an increased efficiency of use of a battery power supply. In addition, because the photographer, seeing the display of whether driving is possible or not, obtains accurate knowledge of the remaining amount of battery power supply, the photographer does not miss battery change periods and can confidently enjoy taking photographs.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A camera system including a photographic lens mounted on a camera body having an electric power supply, comprising:

a first actuator disposed within the photographic lens which selectively receives electric power from the camera body;

a memory disposed within the photographic lens which stores first data relating to power supply characteristics for driving said first actuator;

a power supply measurement unit disposed within the camera body to calculate an equivalent output load resistance of the electric power supply by comparing non-load power supply voltage to load power supply voltage; and a transmission unit disposed within the photographic lens which transmits the first data from said memory to the camera body, wherein electric power is transmitted from the camera body to said first actuator based upon a comparison of the equivalent output load resistance and the first data.

2. The camera system according to claim 1, further comprising:

a power supply characteristics measurement unit disposed within the camera body which measures and acquires second data relating to power supply characteristics of the electric power supply; and a determination unit disposed within the camera body which determines whether to supply electric power from the electric power supply to said first actuator in response to the first and second data.

3. The camera system according to claim 2, further comprising:

a first display unit disposed on the camera body which displays a warning when said determination unit determines not to supply electric power to said first actuator.

4. The camera system according to claim 2, further comprising:

a second actuator disposed within the photographic lens which receives electric power from the camera body;

wherein the first data stored in said memory relates to power supply characteristics for driving said first and second actuators, and said determination unit determines whether to supply electric power from the electric power supply to said first and second actuators in response to the first and second data.

5. The camera system according to claim 2, further comprising:

a second actuator disposed within the photographic lens which receives electric power from the camera body and which selectively operates simultaneously or sequentially with respect to said first actuator;

wherein the first data stored in said memory relates to power supply characteristics for driving said first and second actuators, and said determination unit determines whether to supply electric power from the electric power supply to said first and second actuators simultaneously or sequentially.

6. The camera system according to claim 1, further comprising:

a power supply data accumulation unit disposed within the camera body which accumulates the first data from said transmission unit;

a power supply characteristics measurement unit disposed within the camera body which measures and acquires second data relating to power supply characteristics of the electric power supply; and a determination unit disposed within the camera body which determines whether to supply electric power from the electric power supply to said first actuator in response to the first data from said power supply data accumulation unit and the second data from said power supply characteristics measurement unit.

7. The camera system according to claim 1, further comprising:

a first receiving unit disposed within the photographic lens which receives second data relating to power supply characteristics of the electric power supply from the camera body; and a determination unit disposed within the photographic lens which requests electric power to be supplied from the electric power supply to said first actuator in response to the first and second data.

8. The camera system according to claim 1, further comprising:

a determination unit disposed within the camera body which determines whether to supply electric power from the electric power supply to said first actuator in response to the first data; and a first display unit disposed on the camera body which displays a warning when said determination unit determines not to supply electric power from the electric power supply to said first actuator.

9. A photographic lens which is mountable on a camera body having an electric power supply, comprising:

a first actuator which selectively receives electric power from the electric power supply;

a memory which stores first data relating to power supply characteristics for driving said first actuator; and a receiving unit which receives second data relating to power supply characteristics of the electric power supply, wherein the second data is a calculated equivalent output load resistance of the electric power supply through comparison of non-load power supply voltage to load power supply voltage, and electric power is transmitted from the camera body to said first actuator based upon a comparison of the first and second data.

10. The photographic lens according to claim 9, further comprising:

a determination unit which determines whether the electric power supply can supply electric power for driving said first actuator from the first and second data.

11. The photographic lens according to claim 10, further comprising:

a second actuator disposed within the photographic lens which receives electric power from the camera body;

wherein the first data stored in said memory relates to power supply characteristics for driving said first and second actuators, and said determination unit determines whether to supply electric power from the electric power supply to said first and second actuators in response to the first and second data.

12. The photographic lens according to claim 10, further comprising:

a second actuator disposed within the photographic lens which receives electric power from the camera body and which selectively operates simultaneously or sequentially with respect to said first actuator;

wherein the first data stored in said memory relates to power supply characteristics for driving said first and second actuators, and said determination unit determines whether to supply electric power from the electric power supply to said first and second actuators simultaneously or sequentially.

13. The photographic lens according to claim 10, further comprising:

a transmission unit which transmits a decision result from said determination unit to the camera body.

14. A camera body having an internal electric power supply and mounted to a photographic lens, comprising:

a power supply characteristics measurement unit which measures and acquires first data relating to power supply characteristics of the electric power supply by comparing non-load power supply voltage to load power supply voltage;

a transmission unit which selectively transmits the first data from the power supply characteristics measurement unit to the mounted photographic lens; and a receiving unit which receives decision results indicating actuator power requirements from the mounted photographic lens, wherein electric power is transmitted from the camera body to the mounted photographic lens based upon a comparison of the first data and the decision results.

15. The camera body according to claim 14, further comprising:

a first display unit which displays a warning when the decision results received by said receiving unit indicate insufficient power to operate a lens actuator in the photographic lens.

16. The camera body according to claim 14, further comprising:

a second display unit which performs an inhibition display when the decision results indicate that the lens actuator does not require power.

17. The camera body according to claim 16, further comprising:

plural actuators including said lens actuator;

a timing adjustment unit which inhibits said plural actuators from being driven simultaneously.

18. A camera body according to claim 14, further comprising:

a timing adjustment unit which inhibits plural actuators from being driven simultaneously according to the decision results of said determination unit when a power requirement of said actuator competes with the requirements of the photographic lens and the camera body.

19. A camera system including a photographic lens mounted on a camera body, comprising:

an electric power supply disposed within the camera body;

an actuator disposed within the photographic lens which receives electric power from the electric power supply;

a memory disposed within the photographic lens which stores first data relating to power supply characteristics for driving said actuator;

a transmission unit disposed within the photographic lens which transmits the first data from said memory to the camera body;

a power supply data accumulation unit disposed within the camera body which receives the first data from the transmission unit;

a power supply characteristics measurement unit disposed within the camera body which measures and acquires second data relating to power supply characteristics of the electric power supply by comparing non-load power supply voltage to load power supply voltage; and a determination unit disposed within the camera body which determines whether to supply electric power from the electric power supply to said actuator in response to a received actuator drive demand, the first data and the second data.

20. The camera system according to claim 19, further comprising:

a second actuator disposed within the photographic lens which receives electric power from the camera body;

wherein the first data stored in said memory relates to power supply characteristics for driving said first and second actuators, and said determination unit determines whether to supply electric power from the electric power supply to said first and second actuator in response to the first and second data.

* * * * *

UNITED STATES PATENT AND TRADEMARK OFFICE
CERTIFICATE OF CORRECTION

PATENT NO. : 5,727,241

DATED : March 10, 1998

INVENTOR(S) : Shozo YAMANO, et al.

It is certified that error appears in the above-identified patent and that said Letters Patent is hereby corrected as shown below:

ON THE TITLE PAGE:

Item [75] change "Shingawa-ku" to --Tokyo--.

Signed and Sealed this

Ninth Day of June, 1998

Attest:

BRUCE LEHMAN

Attesting Officer

Commissioner of Patents and Trademarks